(12) United States Patent
Morikawa et al.

(10) Patent No.: US 7,551,220 B2
(45) Date of Patent: Jun. 23, 2009

(54) IMAGE RECORDING/REPRODUCING DEVICE WITH DUAL-OPERATED SWITCH DEPENDING UPON ORIENTATION OF THE DEVICE

(75) Inventors: Masayoshi Morikawa, Kanagawa (JP); Masato Yamaoka, Tokyo (JP); Shogo Kato, Tokyo (JP); Yoshinori Shioyama, Aichi (JP); Nobuhito Ebine, Tokyo (JP)

(73) Assignee: Sony Corporation, Tokyo (JP)

( * ) Notice: Subject to any disclaimer, the term of this patent is extended or adjusted under 35 U.S.C. 154(b) by 768 days.

(21) Appl. No.: 10/399,179

(22) PCT Filed: Jul. 26, 2002

(86) PCT No.: PCT/JP02/07619

§ 371 (c)(1),
(2), (4) Date: Apr. 14, 2003

(87) PCT Pub. No.: WO03/017645

PCT Pub. Date: Feb. 27, 2003

(65) Prior Publication Data

US 2004/0004667 A1   Jan. 8, 2004

(30) Foreign Application Priority Data

Aug. 15, 2001  (JP) .............................. 2001-246479

(51) Int. Cl.
*H04N 5/222* (2006.01)
(52) U.S. Cl. .............................. 348/333.06; 348/333.13; 348/372; 348/14.07; 348/569
(58) Field of Classification Search ............ 348/333.06, 348/333.13, 372, 14.07, 569; D16/202
See application file for complete search history.

(56) References Cited

U.S. PATENT DOCUMENTS 5,661,632 A * 8/1997 Register ..................... 361/683
5,693,914 A * 12/1997 Ogawa .................... 178/18.07
5,796,428 A * 8/1998 Matsumoto et al. .... 348/207.99

(Continued)

FOREIGN PATENT DOCUMENTS

EP    1 096 771    5/2001

(Continued)

OTHER PUBLICATIONS

Includes translation of Terane (JP 11331647 A).*

*Primary Examiner*—David L Ometz
*Assistant Examiner*—Usman Khan
(74) *Attorney, Agent, or Firm*—Frommer Lawrence & Haug LLP; William S. Frommer

(57) ABSTRACT

An image recording/replaying device, such as a video camera, has various operating switches which have enhanced operability so as to suit a mode of use. The image recording/replaying device includes an image display section chat is foldably, unfoldably, and rotatably supported at a body internally incorporating a taking lens. The image recording-replaying device also includes a control switch including an operating key and a plurality of contacts disposed at end portions The control switch further includes direction selection switches which are such that the directions used within the display screen of the image display section corresponding to the directions of the positions of the four end portions of the operating key are changed in accordance with a change in the orientation of the image display section resulting from rotation of the image display section.

2 Claims, 16 Drawing Sheets

U.S. PATENT DOCUMENTS

| | | | | |
|---|---|---|---|---|
| 5,825,675 | A * | 10/1998 | Want et al. | 708/142 |
| 6,137,468 | A * | 10/2000 | Martinez et al. | 345/649 |
| 6,275,376 | B1 * | 8/2001 | Moon | 361/683 |
| D463,469 | S * | 9/2002 | Kawase | D16/202 |
| 6,563,535 | B1 * | 5/2003 | Anderson | 348/231.2 |
| 6,633,336 | B2 * | 10/2003 | Toyoizumi et al. | 348/333.02 |
| 6,658,272 | B1 * | 12/2003 | Lenchik et al. | 455/575.1 |
| 6,738,075 | B1 * | 5/2004 | Torres et al. | 715/723 |
| 6,764,400 | B1 * | 7/2004 | Yokoi et al. | 463/36 |
| 6,813,146 | B2 * | 11/2004 | Haraguchi et al. | 361/681 |
| 6,819,362 | B2 * | 11/2004 | Hsu | 348/374 |
| 6,937,280 | B2 * | 8/2005 | Kawai et al. | 348/333.06 |
| 6,965,413 | B2 * | 11/2005 | Wada | 348/376 |
| D514,149 | S * | 1/2006 | Naito | D16/202 |
| 7,046,286 | B1 * | 5/2006 | Kobayashi et al. | 348/333.06 |
| 7,071,916 | B2 * | 7/2006 | Duarte et al. | 345/156 |
| 7,174,095 | B2 * | 2/2007 | Sato | 396/147 |
| 2001/0004269 | A1 * | 6/2001 | Shibata et al. | 348/333.06 |
| 2001/0011993 | A1 * | 8/2001 | Saarinen | 345/156 |
| 2002/0030668 | A1 * | 3/2002 | Hoshino et al. | 345/175 |
| 2002/0109782 | A1 * | 8/2002 | Ejima et al. | 348/333.01 |
| 2002/0181722 | A1 * | 12/2002 | Hibino et al. | 381/92 |

FOREIGN PATENT DOCUMENTS

| | | | |
|---|---|---|---|
| EP | 1 126 709 | | 8/2001 |
| JP | 11-331647 | | 11/1999 |
| JP | 11-331662 | | 11/1999 |
| JP | 11331647 A | * | 11/1999 |
| JP | 2000-69330 | | 3/2000 |
| JP | 2000-75363 | | 3/2000 |
| JP | 2000075363 A | * | 3/2000 |
| JP | 2000-217024 | | 8/2000 |
| JP | 2000-295509 | | 10/2000 |
| JP | 2002-40540 | | 2/2002 |
| JP | 2003018261 A | * | 1/2003 |
| WO | WO 01 11881 | | 2/2001 |
| WO | WO 01/48587 | * | 5/2001 |

* cited by examiner

IMAGE RECORDING/REPRODUCING DEVICE WITH DUAL-OPERATED SWITCH DEPENDING UPON ORIENTATION OF THE DEVICE

TECHNICAL FIELD

The present invention relates to a technology for, in accordance with states of use, making optimally operable various operating switches that are provided on a body of an image recording/replaying device including an image display section which is foldably and unfoldably supported with respect to the body.

BACKGROUND ART

In general, a related image recording/replaying device, such as a video camera, has an image display section using a liquid crystal display panel.

Types of the image display section include one which is integrally provided with a housing of the body of the video camera (hereinafter referred to as the "fixed image display section") and one which is foldably, unfoldably, and rotatably provided at the housing (hereinafter referred to as the "movable image display section").

As mentioned above, the fixed image display section is integrally provided with the body. Since it does not require a mechanism for folding, unfolding, and rotating the image display section, the entire video camera can be easily reduced in size. However, since the angle of the image display section with respect to the body is always constant, for example, the image display section becomes difficult to see at the time of low-angle shooting. Therefore, freedom with which the image display section is used at the time of shooting is limited, so that, for example, it is difficult to perform a shooting operation.

The movable image display section has a structure allowing it to be foldably, unfoldably, and rotatably supported at the body by a uniaxial or biaxial hinge, so that the angle of the image display section can be adjusted in a suitable state in accordance with various states of use.

In particular, the advantage of a video camera having a movable image display section tends to diversify its states of use. For example, since such a video camera tends to be combined with various other devices in recent years, the video camera, like a cellular phone, can have a mail transmission/reception function and a network browsing function by making it directly connectable to a network, such as the Internet.

However, in general, the operating switches for performing various operations of the video camera are disposed at locations and have shapes that allow them to be easily operated while the body is held at the time of shooting, so that, in the case where the image display section is accommodated in the body in a state of use other than the shooting state, that is, with its display screen facing the outside, when various operations are carried out while viewing the display screen, the operating switches are difficult to operate.

Therefore, when the video camera is directly connectable to a network, such as the Internet, for example, inputting of characters for transmitting and receiving a mail or browsing a network could only be carried out by either using the operating switches in not easily operable states or using an additional special-purpose operating switch. The provision of the special-purpose operating switch inevitably results in increases costs.

In view of the aforementioned problems, it is an object of the present invention to make it possible to enhance operability of various operating switches so as to suit a state of use in an image recording/replaying device, such as a video camera.

DISCLOSURE OF INVENTION

To overcome the aforementioned problems, according to the present invention, there is provided an image recording/replaying device including an image display section foldably, unfoldably, and rotatably supported at a body including a taking lens. The image recording/replaying device comprises a control switch comprising an operating key and a plurality of contacts disposed at end portions and an intersection of a cross-shaped portion of the operating key in correspondence with end portions and the central portion of the operating key, in which, by pressing any one of the end portions and the central portion of the operating key, the contact disposed in correspondence with the pressed portion is closed. The control switch further comprises direction selection switches which are such that particular directions within a display screen of the image display section correspond to the directions of the positions of the four end portions of the operating key. The direction selection switches are such that the directions used within the display screen of the image display section and corresponding to the directions of the positions of the four end portions of the operating key are changed in accordance with a change in the orientation of the image display section resulting from rotation of the image display section.

Therefore, in various states of use of the image recording/replaying device resulting from the folding, unfolding, and rotation of the image display section, it is possible to match the directions in the display screen of the image display section and the directions that are selected by the direction selecting switches of the controller switch.

BRIEF DESCRIPTION OF THE DRAWINGS

FIG. 14 shows a screen display just before carrying out the operation.

BEST MODE FOR CARRYING OUT THE INVENTION

Figure 1:
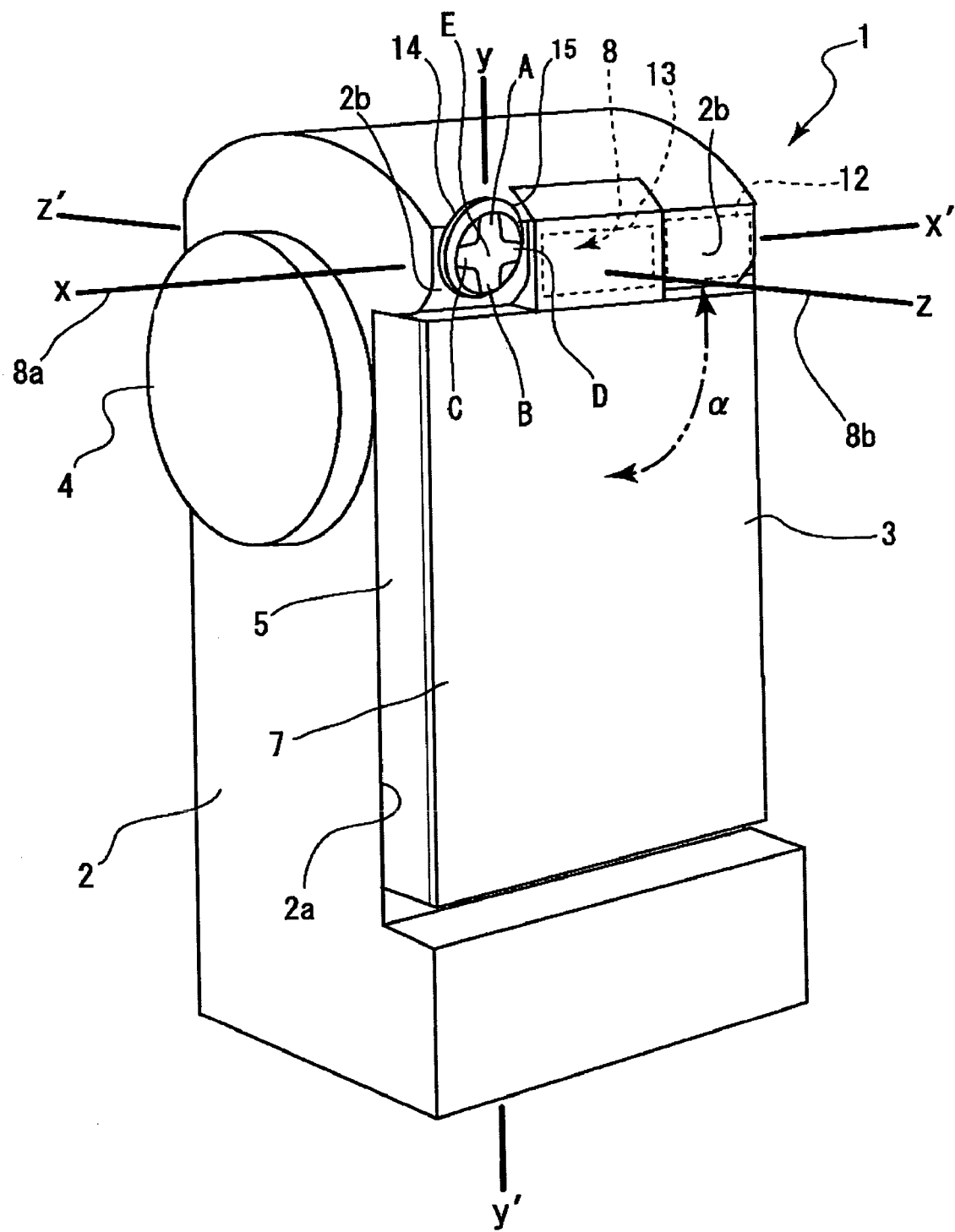
FIG. 1 shows, along with FIGS. 2 to 13, an embodiment of an image recording/replaying device, and is a perspective view of the image recording/replaying device when an image display panel is accommodated.

Hereunder, an embodiment of an image recording/replaying device of the present invention will be given with reference to the attached drawings. In the embodiment described below, the present invention is applied to a small video camera.

As shown in FIGS. 1 to 4, a video camera 1 comprises a body 2 including a vertically long rectangular housing and an image display section 3 foldably, unfoldably, and rotatably supported at one side surface of the body 2 by a hinge mechanism (described later).

A taking lens 4 and an EVF (electric view finder) are disposed on the upper portion of the body 2. For example, a recording/replaying mechanism for recording information onto and replaying information from a removable recording medium (externally-mounting-type memory, such as what is called a memory stick, a magnetic tape, an optical disk, etc.), which is not shown, is disposed at a side of the body 2 opposite to the side where the image display section 3 is supported. An accommodation recess 2a for accommodating the image display section 3 when it is folded is formed at the side where the image display section 3 is supported. Accommodation protrusions 2b and 2b for accommodating a supporting section of the hinge mechanism for supporting the image display section 3 are provided above the accommodation recess 2a.

Forward-and-rearward, upward-and-downward, and leftward-and-rightward directions are defined as follows. As shown in FIG. 1, a horizontal direction (x-x' axis direction), which is a direction parallel to the optical axis of the taking lens, is the forward-and-rearward direction; a direction (y-y' axis direction) perpendicular to the x-x' axis in a vertical plane including the x-x' direction is the upward-and-downward direction; and a direction (z-z' axis direction) perpendicular to both the x-x' axis direction and the y-y' axis direction is the leftward-and-rightward direction. (The x direction is the forward direction, the x' direction is the rearward direction, the y direction is the upward direction, the y' direction is the downward direction, the z direction is the leftward direction, and the z' direction is the rightward direction.)

Figure 3:
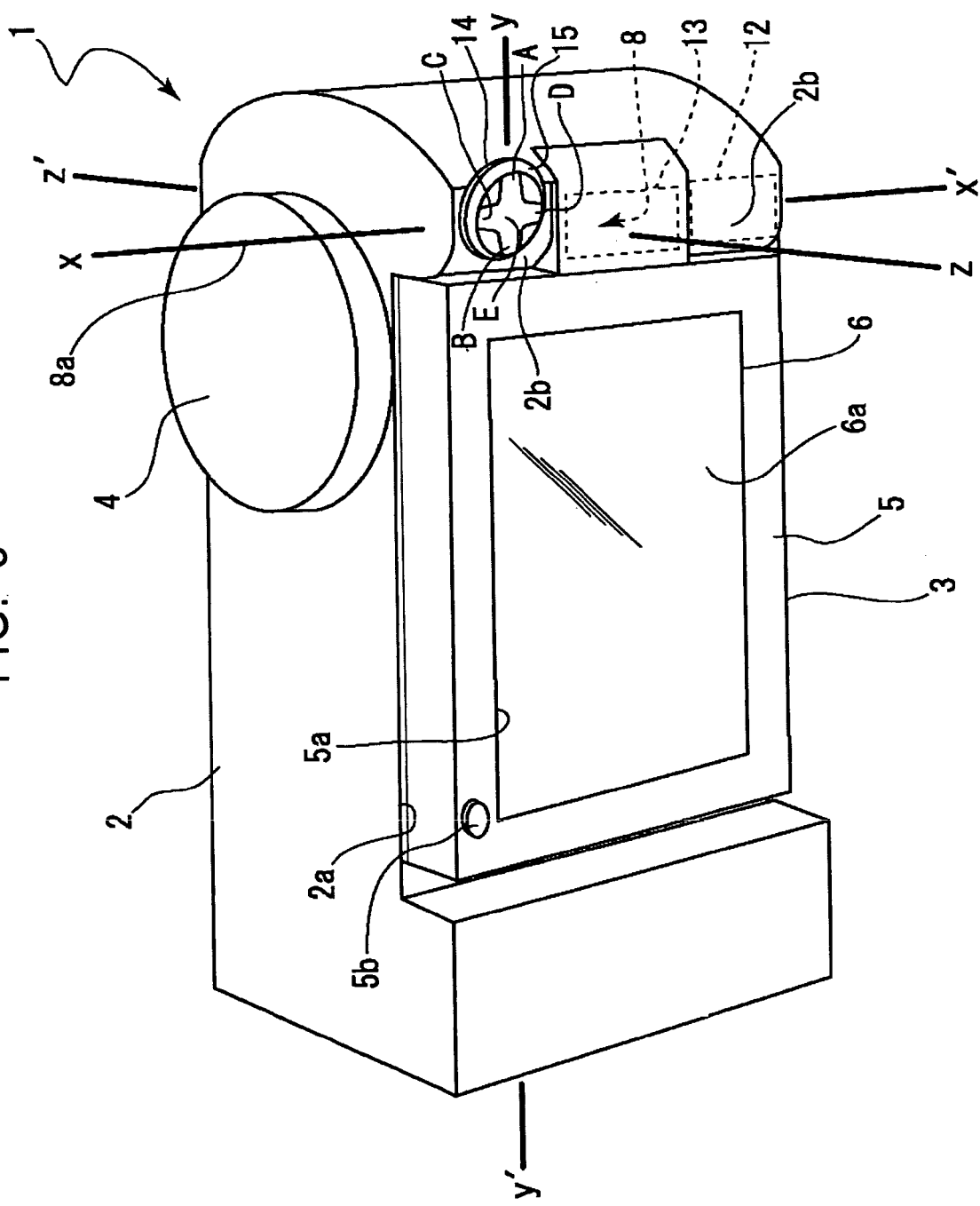
FIG. 3 is a perspective view of the image recording/replaying device when the image display section is in a reversed accommodated state.
Figure 4:
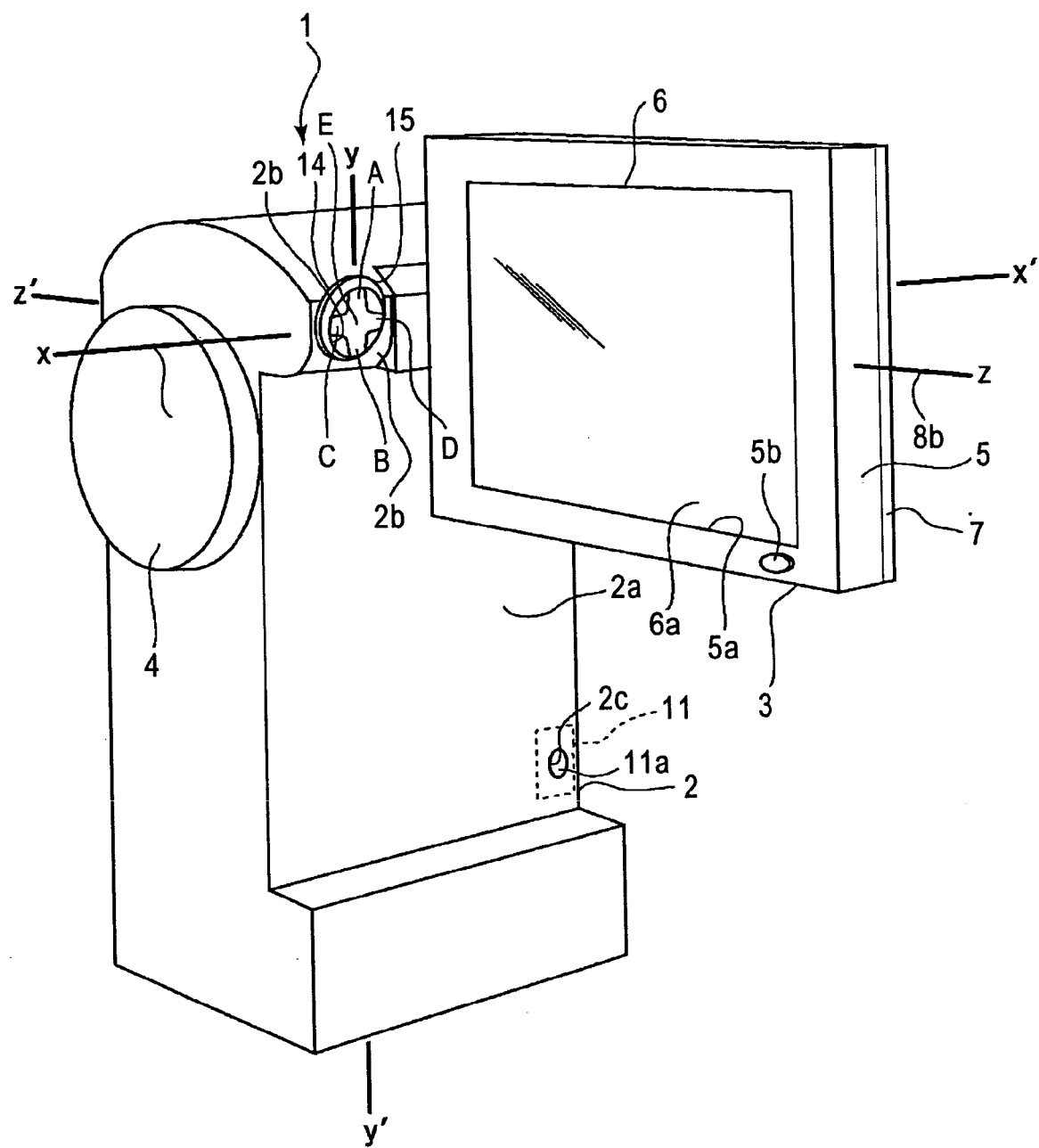
FIG. 4 is a perspective view of the image recording/replaying device when the image display section is in a forwardly facing shooting state.

As shown in FIGS. 3 and 4, the image display section 3 has a liquid crystal panel (hereinafter referred to as the "LCD panel") having a screen size of the order of 2.5 inches mounted and secured to the inner sides of a frame 5 having a vertically long rectangular opening 5a in the central portion. The LCD panel 6 is covered by a cover 7 mounted to the frame 5. Therefore, the LCD panel 6 is disposed inside a space defined by the frame 5 and the cover 7 so that an image display section 6a is exposed from the opening 5a of the frame 5.

A hinge mechanism 8 supports the image display section 3 having the above-described structure so that it can be freely folded and unfolded in the directions of a double-headed arrow α from a state shown in FIG. 1 in which the image display section 3 is accommodated in the accommodation recess 2 so that the image display surface 6a faces inward (hereinafter referred to as the "accommodated state") to a state indicated by alternate long and two short dashed lines in FIG. 2 in which the image display section 3 is unfolded by an angle of approximately 90 degrees (hereinafter referred to as the "unfolded state") with a folding-and-unfolding axis 8a extending in the x-x' direction as a center of rotation; and so that it can freely rotate to an angle of approximately 270 degrees in the direction of a double-headed arrow β in FIG. 2 from the unfolded state to a state in which the image display surface 6a shown in FIG. 4 faces forward (hereinafter referred to as the "forwardly facing shooting state") with a rotational axis 8b extending in the z-z' direction as a center of rotation. The state shown in FIG. 2 in which the image display surface faces rearwards after rotation by 90 degrees from the unfolded state is the "ordinary shooting state." The state in which the image display surface 6a faces upwards after rotation by 180 degrees is the "low-angle shooting state." The state shown in FIG. 3 in which the image display section 3 is accommodated in the accommodation recess 2a so that the image display surface 3 faces the outside as a result of folding the image display section 3 without rotating the image display section 3 in the low-angle shooting state is the "reversed accommodated state."

The hinge mechanism 8 has a biaxial structure including the folding-and-unfolding axis 8a and the rotational axis 8b, which are shown by phantom lines. As described above, the folding-and-unfolding axis 8a extends in the horizontal direction (that is, the x-x' direction shown in FIG. 1), while the rotational axis 8b extends in a direction perpendicular to the folding-and-unfolding axis (that is, the z-z' direction shown in FIG. 2). The hinge mechanism 8 is not structurally limited as long as it has a biaxial structure including the folding-and-unfolding axis 8a and the rotational axis 8b.

As described above, the image display section 3 can be set at each of the states, the accommodated state, unfolded state, ordinary shooting state, low-angle shooting state, reversed accommodated state, and forwardly facing shooting state, by foldably, unfoldably, and rotatably supporting the image display section 3 by the hinge mechanism 8. Therefore, in order to detect that the image display section 3 is in any one of these various states, and, in accordance with the state of the image display section 3, in order to apply electrical power to the LCD panel 6 including turning on a backlight, invert a display image, and change the directions of operating switches so as to match the directions of the image display surface 6a of the image display section 3 described later, as shown in FIGS. 1 to 4, the video camera 1 has one detecting means provided towards the lower rear portion of the accommodation recess of the body 2, and one detecting means each around the folding-and-unfolding axis 8a and the rotational axis 8b of the hinge mechanism 8. These detecting means are folding-and-unfolding-state detecting means 11 for detecting whether the image display section 3 is folded or unfolded; folding-and-unfolding-angle detecting means 12 for detecting that the image display section 3 is unfolded to a particular angle; and rotation detecting means 13 for detecting that the image display section 3 has been rotated to a particular angle. The folding-and-unfolding-state detecting means 11, the folding-and-unfolding-angle detecting means 12, and rotation detecting means 13 are formed so that, when the image display section 3 is in a particular state (described later), a contact is closed by pressing an appropriate presser portion using, for example, an existing contact switch.

Figure 2:
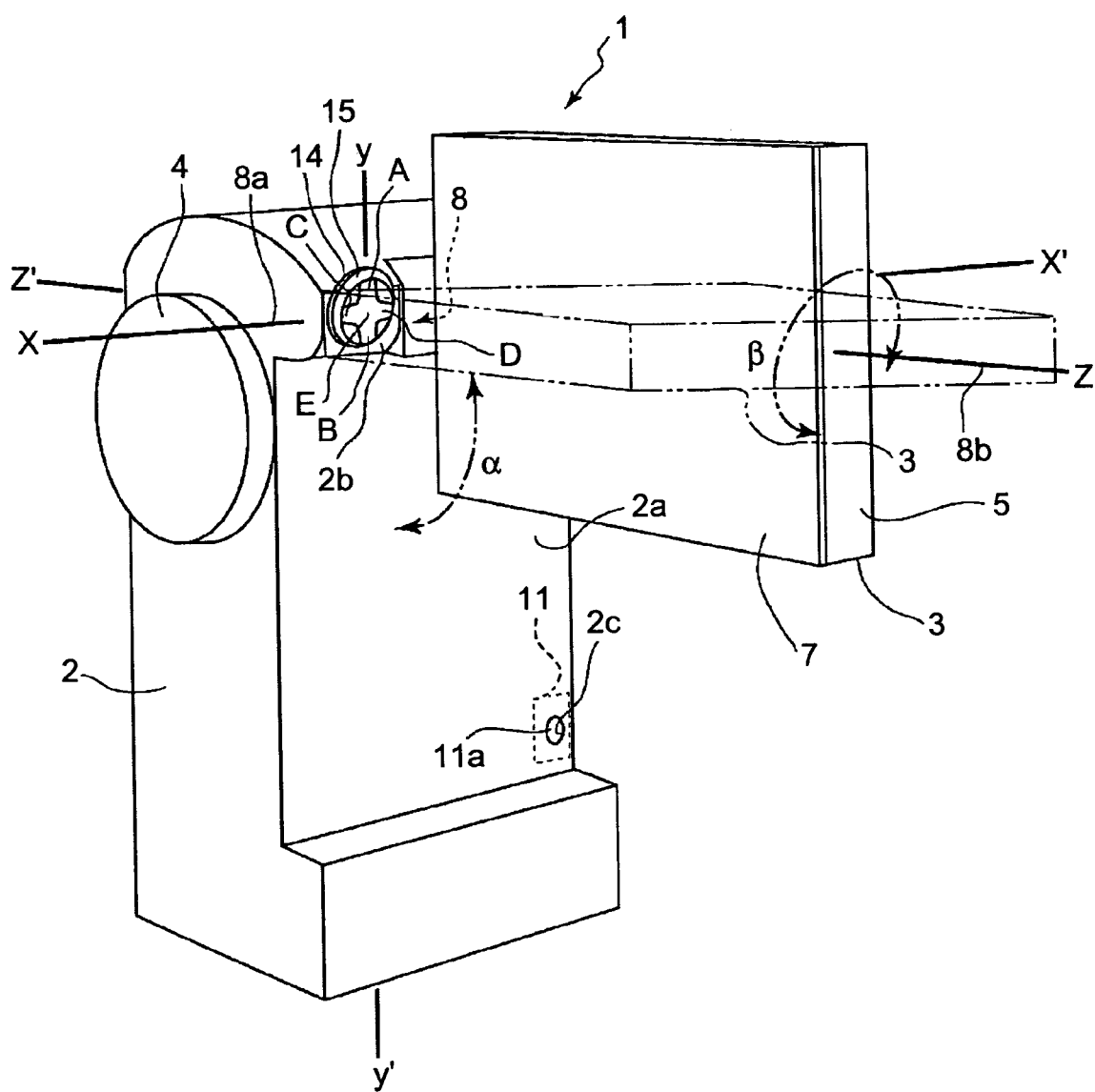
FIG. 2 is a perspective view of the image recording/replaying device when an image display section is in an ordinary shooting state.

As shown in FIGS. 2 and 4, the folding-and-unfolding-state detecting means 11 is formed by, for example, disposing a contact switch body secured to a substrate (not shown) inside the housing at the accommodation recess 2a of the body 2. The switch body has an operating element for closing a contact by being pressed, and an end portion 11a of the operating element is positioned inside a hole 2c that is formed in the accommodation recess 2a.

A presser protrusion 5b is provided at a proper location of the surface of the frame 5 so that, when the image display section 3 is folded and accommodated, the contact of the switch body is closed as a result of pressing the end portion 11a of the operating element.

Accordingly, when the image display section 3 is accommodated, the end portion 11a of the operating element of the folding-and-unfolding-state detecting means 11 is pressed by the presser protrusion 5b in order to close the contact of the switch body. In contrast, in the case where the image display section 3 is brought into the reversed accommodated state by temporarily unfolding it, rotating it by 180 degrees, and accommodating it in the accommodation recess 2a, since a protrusion which can press the end portion 11a of the operating element of the folding-and-unfolding-state detecting means 11 is not provided on the cover 7 disposed at the side that comes into contact with the surface of the accommodation recess 2a, the folding-and-unfolding detecting means 11 does not turn on due to the closure of the contact of the folding-and-unfolding detecting means 11.

The folding-and-unfolding-angle detecting means 12 is disposed around the folding-and-unfolding axis 8a of the hinge mechanism 8. When the image display section 3 is unfolded from the folded state to an angle of 90 degrees with the folding-and-unfolding axis 8a as the center of rotation, the folding-and-unfolding-angle detecting means 12 is turned on as a result of, for example, a contact inside a switch body being closed by operation of a presser portion (not shown) which rotates as the image display section 3 is folded or unfolded. The rotation detecting means 13 is formed so that it is turned off except when the image display section 3 is unfolded at an angle of 90 degrees.

The rotation detecting means 13 is disposed around the rotational axis 8b of the hinge mechanism 8. When the image display section 3 is rotated from the unfolded state to a particular angle with the rotational axis 8b as the center, the rotation detecting means 13 is turned on as a result of, for example, a contact inside a switch body being closed by operation of a presser portion (not shown) which rotates as the image display section 3 rotates. The angle at which the rotation detecting means 13 is turned on is set at 225 degrees in the video camera 1. The rotation detecting means 13 is formed so that, when the angle of rotation of the image display section 3 is within a range of from 225 to 270 degrees, it is kept on while the contact remains closed, whereas, when the angle of rotation of the image display section 3 is at an angle other than the angles of the aforementioned range, it is turned off.

The body 2 has, for example, a power switch and a mode change-over switch (not shown) at the back surface thereof, and, as shown in FIGS. 1 to 4, a control switch 14 disposed at the front accommodation protrusion 2b with the surface of an operating key (described later) facing leftwards. The control switch 14 is primarily used to perform various operations while looking at the EVF or a screen display of the image display surface 6a of the image display section 3. As shown in FIG. 3, when the image display section 3 is in the reversed accommodated state, the video camera 1 is primarily used with the vertically long rectangular body 2 having its long side positioned horizontally as a result of setting it horizontally, and the body is held primarily with the right hand. The control switch 14 is disposed at a location which is convenient for performing operations in the reversed accommodated state of the image display section 3 with the right thumb.

FIGS. 6 to 13 show the structure of the control switch 14. The directions indicated in these figures are used as directions of the control switch 14 when it is secured to the body 2. These directions are up, down, front, rear, left, and right.

Figure 6:
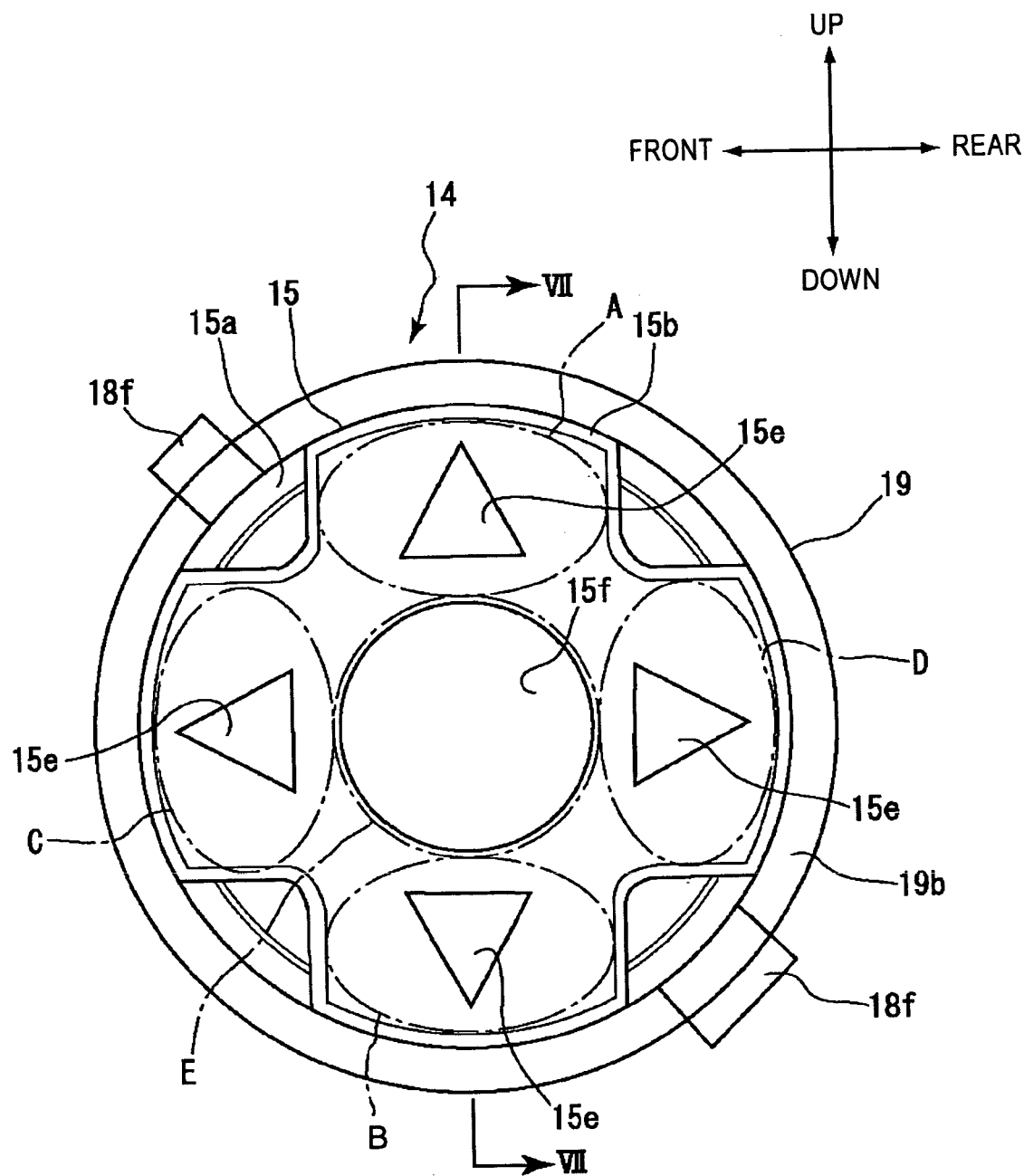
FIG. 6 is a front view of a control switch.
Figure 7:
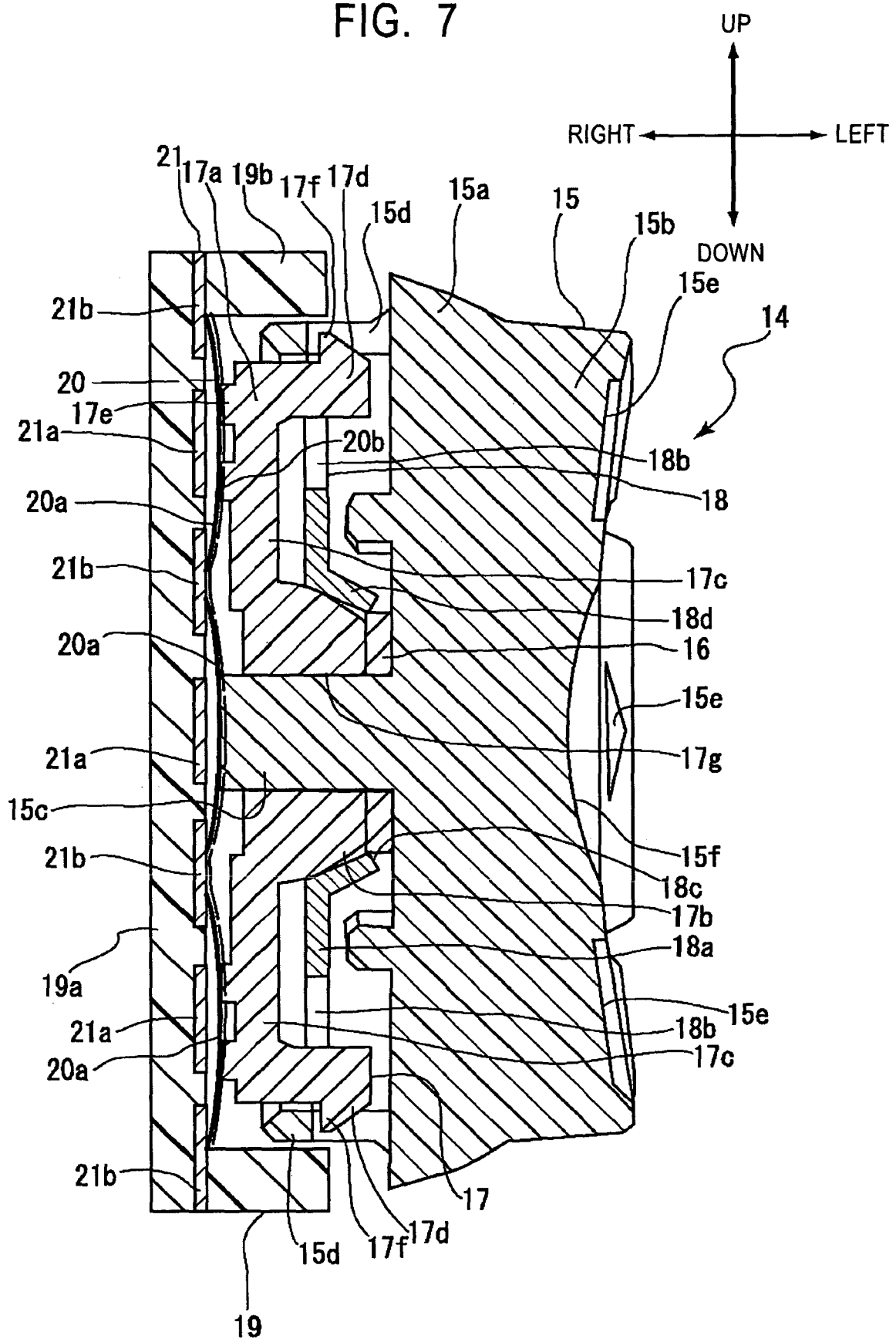
FIG. 7 is a vertical sectional view taken along line VII-VII shown in FIG. 6.
Figure 8:
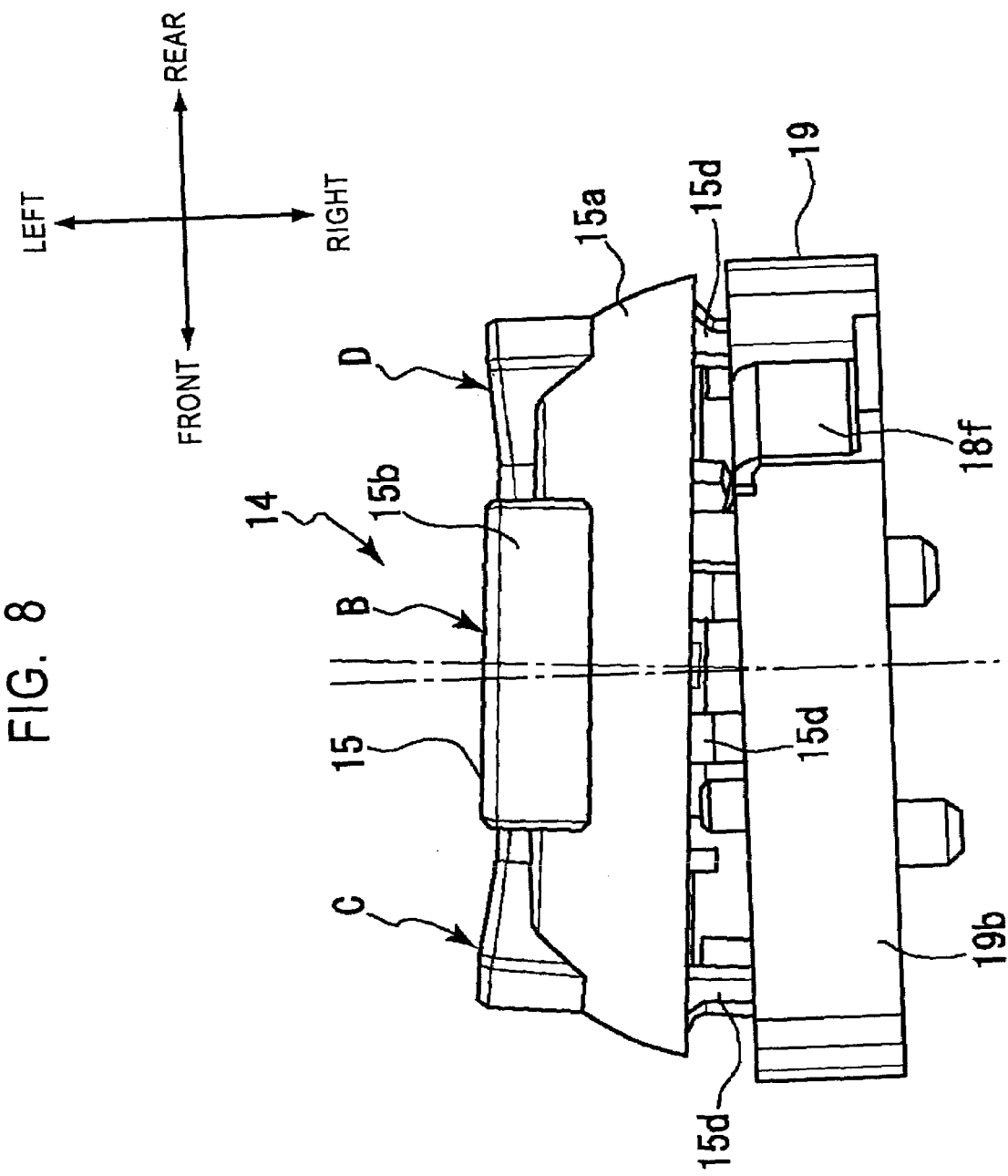
FIG. 8 is a plan view showing a state in which a direction selection switch has been pressed when the control switch is viewed from below it.

As shown in FIGS. 6 to 8, the control switch 14 comprises five switches that are combined into an integral structure, with each switch having one contact. As described later, the control switch 14 comprises direction selection switches A, B, C, and D, and a determination switch E, which are disposed at the four ends and the center of a cross-shaped portion, respectively. Any one of the direction selection switches A, B, C, and D is used to select an item by moving a cursor, a pointer, or an inverted item display to a particular direction within the display screen of the image display surface of the image display section 3. The determination switch E is used to determine the selection of the item performed by any one of the direction selection switches A, B, C, and D. The control switch 14 is formed by an operating key 15, a resilient member 16, a contact presser member 17, a cover 18, a base member 19, and a contact member 20.

As shown in FIGS. 6 to 8, the portions of the operating key 15 are integrally formed using acrylonitrile-butadiene-styrene resin (ABS resin) so that they can be easily processed and subjected to surface treatment, such as printing, and have strength. More specifically, the operating key 15 comprises a substantially disk-shaped base portion 15a and a keytop 15b, which is a leftwardly protruding, substantially cross-shaped area at the left surface of the base portion 15a. A circular cylindrical supporting shaft 15c and engaging protrusions 15d are provided at the right surface (back surface) of the base portion 15a. The supporting shaft 15c protrudes towards the right from the center of the base portion 15a, and the engaging protrusions 15d are disposed at the outer peripheral portion at a 90-degree interval in the circumferential direction, protrude rightwards, and have respective engaging holes.

As described later, the operating key 15 is formed so that, when four end portions, the top, bottom, front, and rear end portions, and the central portion of the substantially cross-shaped keytop 15b corresponding to the direction selection switches A, B, C, and D, and the determination switch E are individually pressed rightwards, five different movable contacts (described later) of the contact member 20 corresponding to these portions are flexed and set on. The surface of the keytop 15b is gently curved upwards and downwards and forward and rearwards. In order to make it easier to distinguish between pressing portions when any one of them is touched with a fingertip, triangular recesses 15e are formed in the four end portions of the keytop 15b, and a circular recess 15f is formed in the central portion of the keytop 15b. As shown in FIG. 6, the direction selection switches A, B, C, and D, and the determination switch E are disposed below the keytop 15b of the operating key 15 so that the top end portion is disposed in correspondence with the switch A, the bottom end portion with the switch B, the front end portion with the switch C, the rear end portion with the switch D, and the central portion with the switch E.

Figure 9:
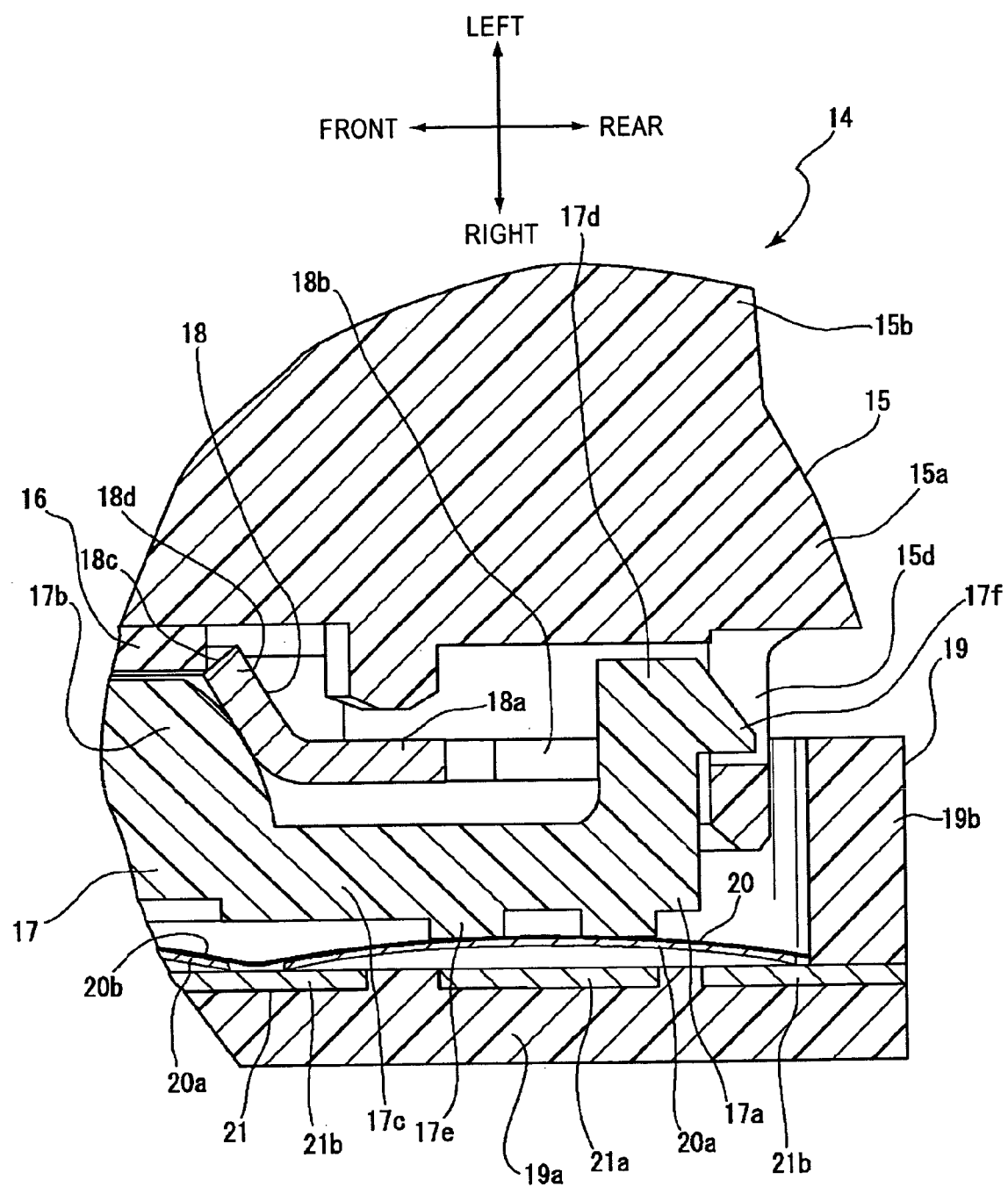
FIG. 9 is an enlarged sectional view of a portion of the control switch.

As shown in FIGS. 7 and 9, the resilient member 16 has a flat annular shape and is formed of, for example, silicone rubber, which is a resilient material, and is externally fitted to the base of the supporting shaft 15c of the operating key 15. In the case where the control switch 14 is operated (in particular, when the center determination switch E is operated), when the operating key 15 is released, the resilient member 16 urges the operating key 15 to be restored to its original state, improves the feel of the operating key 15 when it is pressed, and absorbs sound when the operating key 15 is operated.

The portions of the contact presser member 17 are integrally formed using, for example, polybutylene terephthalate resin (PBT) so that it has a predetermined strength and a proper resiliency.

Figure 13:
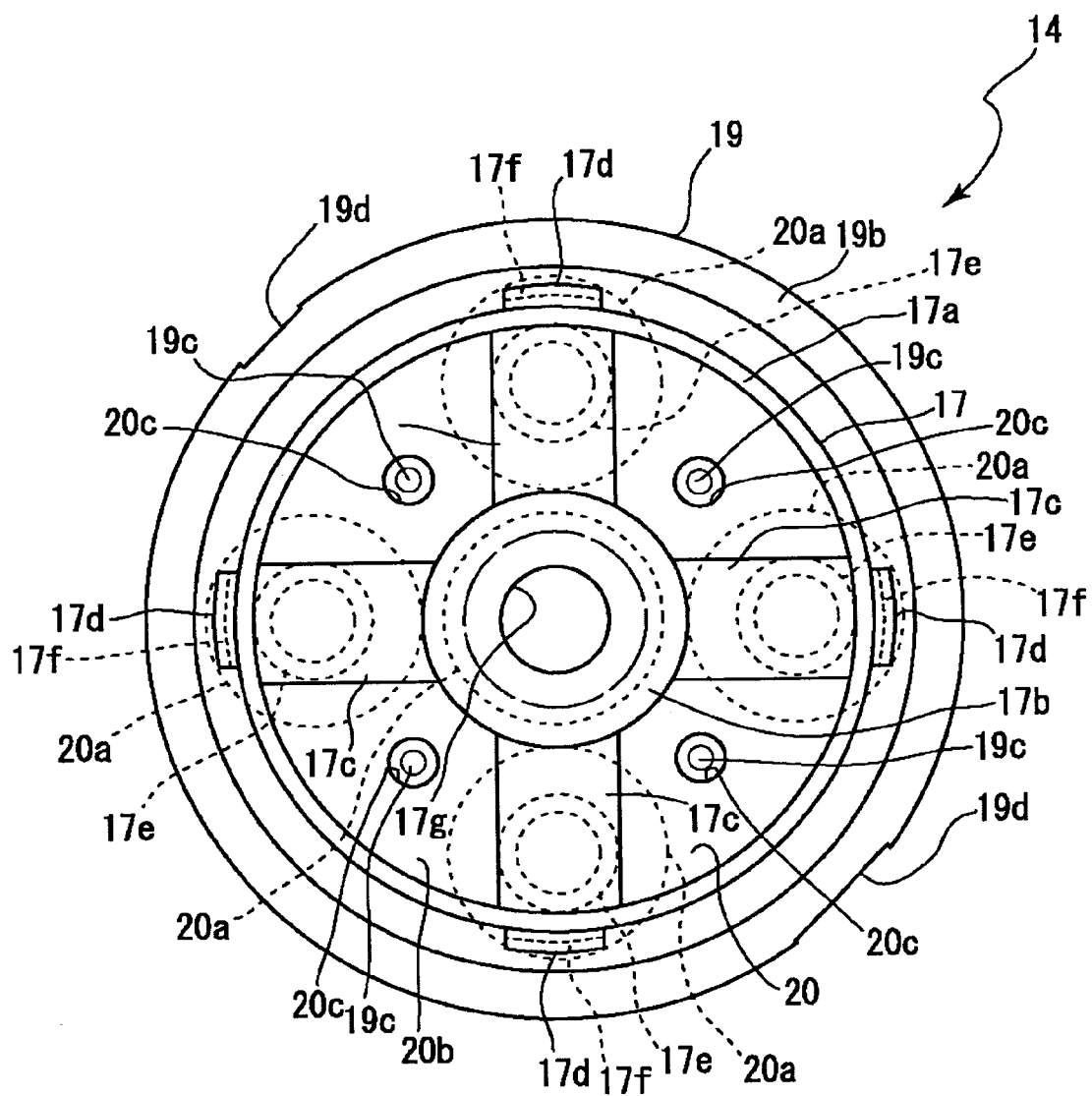
FIG. 13 is a side view of the control switch without the operating key, a resilient member, and a cover.
Figure 14:
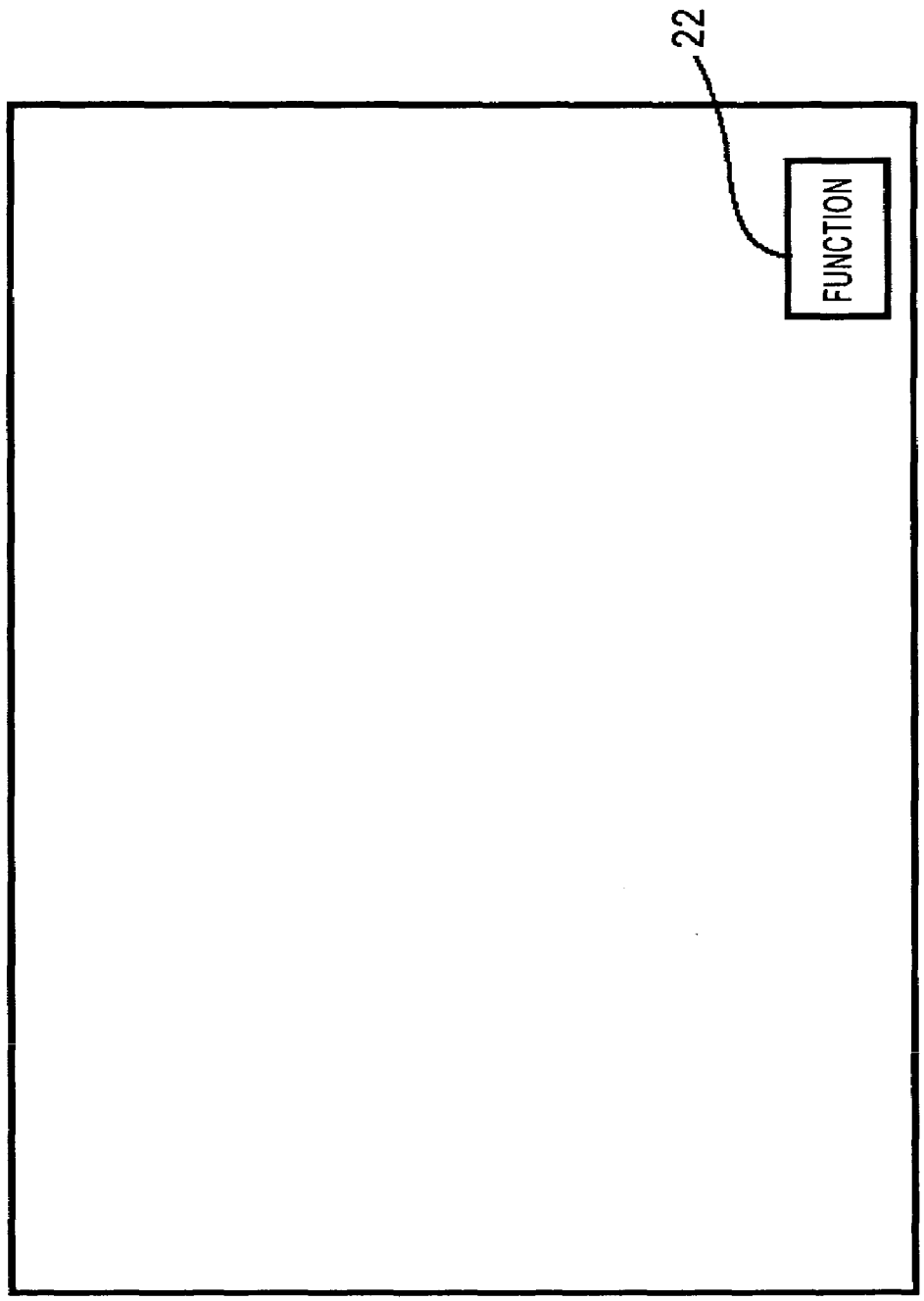
FIG. 14 is a schematic view showing, along with FIGS. 15 and 16, a screen display used when carrying out an operation using the control switch.

More specifically, as shown in FIGS. 7, 9, and 13, the contact presser member 17 comprises an annular outer peripheral portion 17a and a truncated conical boss 17b protruding leftwards at the center. The outer peripheral portion 17a and the boss 17b are connected by spokes 17c extending radially at a 90-degree interval in the peripheral direction at the outer edge of the boss 17b. Leftwardly protruding engaging protrusions 17d are integrally formed at the connection portions between the outer peripheral portion 17a and the spokes 17c. Presser protrusions 17e, which are righwardly protruding substantially annular areas, are formed at the portions near the connection portions of the spokes 17c. Outwardly protruding engaging pawls 17f are integrally formed at the left end portions of the respective engaging protrusions 17d. An insertion hole 17g for inserting the supporting shaft 15c of the operating key 15 is formed so as to pass through the central portion of the boss 17b of the contact presser member 17.

Figure 12:
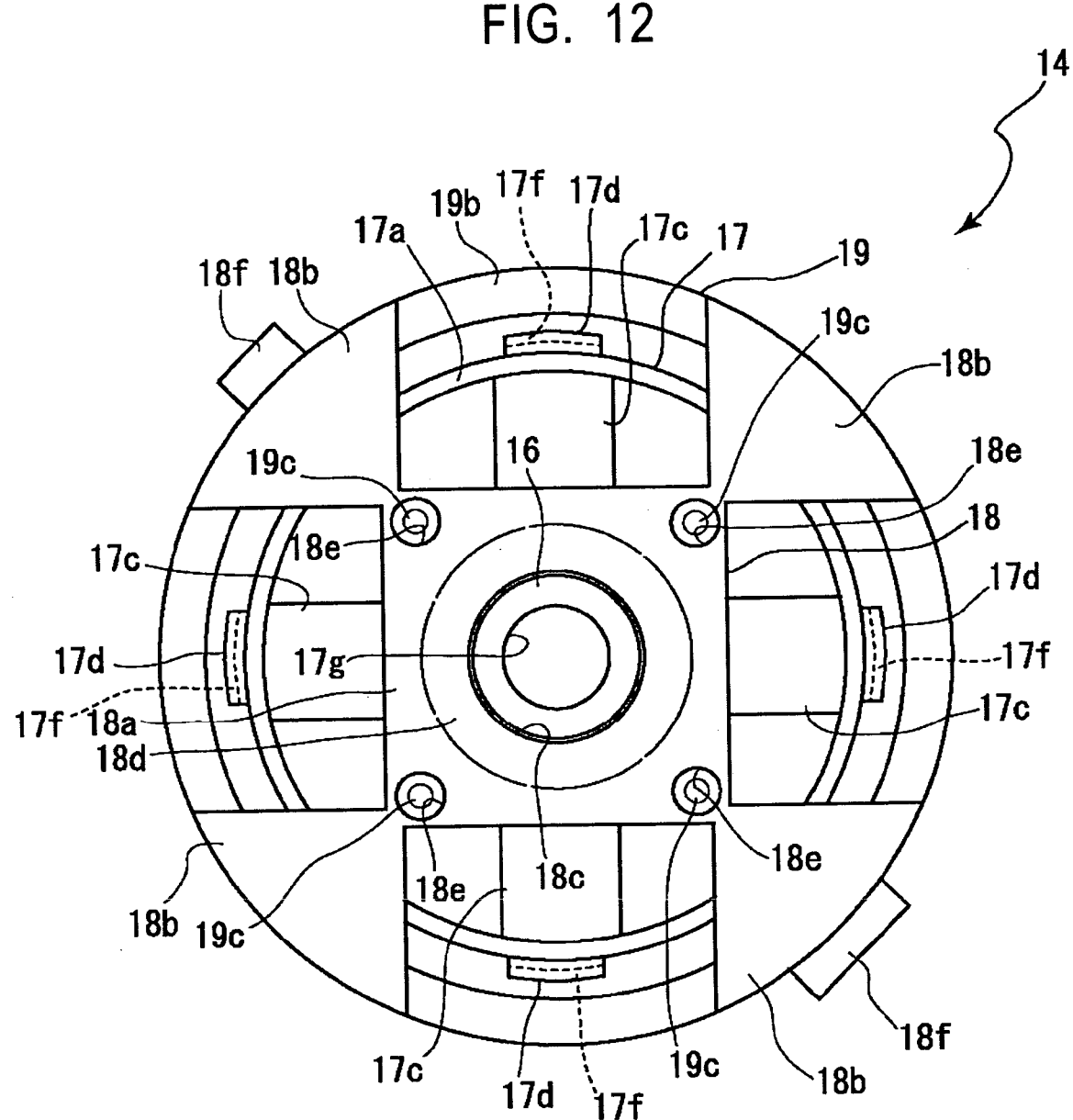
FIG. 12 is a left side view of the control switch without an operating key.

The portions of the cover 18 are integrally formed using a tin steel plate (SPTE), and, as shown in FIGS. 7, 9, and 12, the outside diameter of the cover 18 is slightly larger than that of the contact presser member 17 and is substantially the same as that of the base member 19.

More specifically, the cover 18 comprises a substantially square main portion 18a and fan-shaped contact portions 18b which protrude radially from corners of the main portion 18a and whose ends contact the base member 19. A fitting hole 18c passes through the center of the main portion 18a, and an engaging portion 18d is formed in accordance with the external shape of the boss 17b of the contact presser member 17 by processing the central circular area of the main portion 18a into a tapering form which protrudes leftwards towards the center. Engaging holes 18e are formed in the main portion 18a of the cover 18 at a 90-degree interval in the peripheral direction so as to surround the engaging portion 18d. As shown in FIGS. 6, 8, and 12, positioning portions 18f protrude rightwards from end portions of two of the contact portions 18b, that is, the contact portion 18b protruding forward and obliquely upwards and the contact portion 18b protruding rearward and obliquely downward. Although not shown in detail, the front ends of the positioning portions 18f and 18f are bent at substantially right angles and protrude outward.

As shown in FIGS. 6 to 13, the base member 19 is formed of polyamide (PA)/nylon resin, more specifically, nylon 6 so that it absorbs vibration and has strength, and has the form of a substantially circular receptacle which opens towards the left. The base member 19 comprises a substantially disk-shaped bottom portion 19a, a peripheral wall 19b that is provided along the outer edge of the bottom portion 19a, and securing protrusions 19c protruding leftwards from locations corresponding to the locations of the engaging holes 18e of the cover 18 of the bottom portion 19a. The inside diameter of the peripheral wall 19b of the base member 19 is substantially the same as the outside diameter of the contact presser member 17. Engaging grooves 19d and 19d extending towards the left and right for engaging the respective positioning portions 18f and 18f of the cover 18 are formed at the forward and obliquely upper location and the rearward and obliquely lower location of the outer peripheral surface of the peripheral wall 19b, respectively.

A wire 21 having two types of stationary contacts 21a and stationary contacts 21b, formed of a copper alloy plated with silver, are integrally formed with the left surface of the bottom portion 19a of the base member 19 by insert molding. The arrangement patterns of the stationary contacts 21a and stationary contacts 21b are such that, for example, the stationary contacts 21a are disposed in a circular arrangement and the stationary contacts 21b are disposed in an annular arrangement so as to surround the stationary contacts 21a. The locations where the stationary protrusions 19c of the base member 19 are disposed are displaced 90 degrees in the peripheral direction from the locations of the stationary contacts 21a and the stationary contacts 21b.

As shown in FIGS. 7 and 9, the contact member 20 has movable contacts 20a disposed in correspondence with the four end portions, the top, bottom, front, and rear end portions, and the central portion of the cross-shaped keytop 15b of the operating key 15. The contact member 20 comprises five movable contacts 20a having the shape of a flat dome and formed of stainless steel (SUS), which is a resilient material, and a film 20b which is formed of polyethylene terephtalate resin (PET) having heat resistance and which has the movable contacts 20a secured thereto. Holes 20c for inserting the respective securing protrusions 19c of the base member 19 are formed in the contact member 20.

By securing the movable contacts 20a to the film 20b of the contact member 20, the film 20b positions and integrally forms the movable contacts 20a, insulates the movable contacts 20a from other structural members of the control switch 14, and, as described later, absorbs, for example, sound when the movable contacts 20a are pressed and flexed by the operating key 15 or the contact presser member 17 and when the movable contacts 20a are restored to their original shapes. Therefore, the contact member 20 has as a whole the shape of a circular sheet having five leftwardly bulging portions formed at the movable contacts 20a and fitting exactly to the bottom portion of the base member 19.

In the control switch 14 having the above-described structure, the structural members are assembled in the following way.

First, the contact member 20 is placed on the bottom surface of the base member 19 while inserting the securing protrusions 19c of the base member 19 into the respective holes 20c of the contact member 20. By this, the movable contacts 20a of the movable member 20 are positioned on the left side of the stationary contacts 21a and the stationary contacts 21b, and the outer peripheral portions of the movable contacts 20a are in contact with the stationary contacts 21b.

As shown in FIG. 13, the contact presser member 17 is placed onto the left side of the contact member 20 that has been placed on the bottom surface of the base member 19. At this time, the securing protrusions 19c of the base member 19 protrude from portions between the spokes 17c of the contact presser member 17.

Next, the cover 18 is placed onto the contact presser member 17. More specifically, as shown in FIGS. 9 and 12, the engaging grooves 19d of the base member 19 and the positioning portions 18f of the cover 18 are aligned, the engaging portion 18d of the cover 18 is superimposed upon the boss 17b of the contact presser member 17, and the securing protrusions 19c of the base member 19 protruding from the portions between the spokes 17c of the contact presser member 17 are inserted into the respective engaging holes 18e of the cover 18. By this, at the cover 18, ends of the securing protrusions 19c protrude slightly leftwards from the respective engaging holes 18e, the engaging protrusions 17d protrude leftwards from portions between two adjacent contact portions 18*b* of the cover 18, ends of the contact portions 18*b* contact the left end surfaces of the peripheral wall 19*b* of the base member 19, and the positioning portions 18*f* engage their respective engaging grooves 19*d* of the base member 19. Then, the ends of the securing protrusions 19*c* of the base member 19 protruding leftwards from their respective engaging holes 18*e* of the cover 18 are caulked (welded), so that the cover 18 is secured to the base member 19.

As shown in FIG. 7, by securing the cover 18 to the base member 19, the presser protrusions 17*e* of the contact presser member 17 and the movable contacts 20*a* of the contact member 20 are aligned. Accordingly, the presser protrusions 17*e* of the contact presser member 17 face the stationary contacts 21*a* and the stationary contacts 21*b* of the wiring 21 at the base member 19 with the film 20*b* and the movable contacts 20*a* of the contact member 20 being disposed between the presser protrusions 17*e* and the stationary contacts 21*a* and the stationary contacts 21*b*.

Lastly, the operating key 15 is mounted to the base member 19. More specifically, as shown in FIGS. 7 and 9, the supporting shaft 15*c* of the operating key 15 is inserted into the insertion hole 17*g* of the contact presser member 17 that is disposed within the base member 19, and the engaging pawls 17*f* at the engaging protrusions 17*d* of the contact presser member 17 that protrude from the portions between the contact portions 18*b* of the cover 18 and the right open edge defining the engaging holes of the respective engaging protrusions 15*d* of the operating key 15 engage each other. By this, the operating key 15 and the base member 19 are integrally formed. When the supporting shaft 15*c* of the operating key 15 is inserted in the insertion hole 17*g* of the contact presser member 17, the end portion of the supporting shaft 15*c* protrudes slightly rightwards from the insertion hole 17*g* and only contacts the surface of the contact member 20. As shown in FIG. 12, the resilient member 16 externally fitted to the base of the supporting shaft 15*c* of the operating key 15 is positioned on the left side of the boss 17*b* of the contact presser member 17, and within the fitting hole 18*c* of the cover 18 that is superimposed upon the boss 17*b*.

Figure 10:
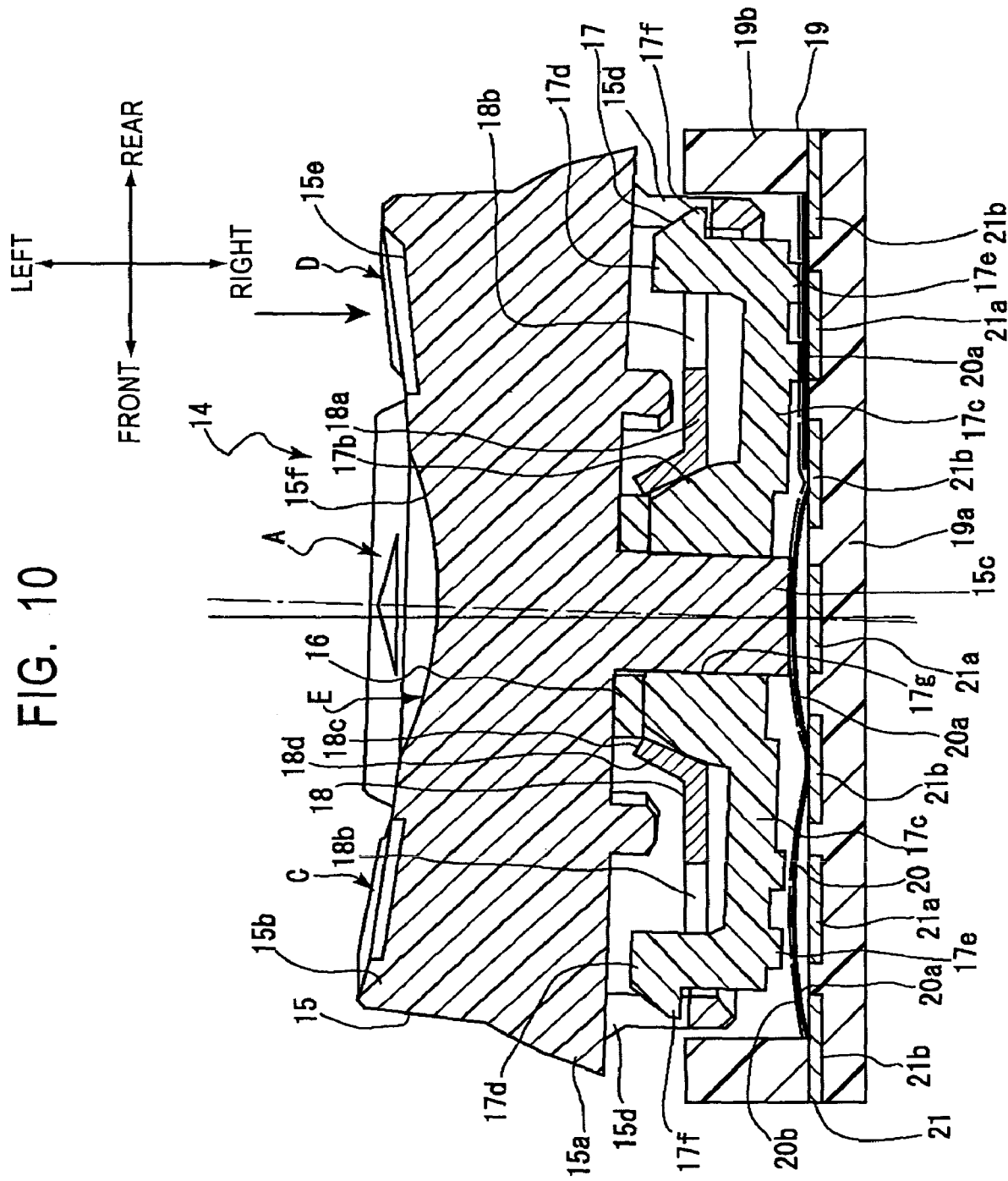
FIG. 10 is a sectional view showing a state in which a direction selection switch has been pressed.

In the case where the control switch 14 is incorporated in the housing of the body 2 of the video camera 1 shown in FIGS. 1 to 4, when any of the four end portions of the cross-shaped keytop 15*b* corresponding to the direction selection switches A, B, C, and D, respectively, for example, when the direction selection switch D is pressed towards the right, as shown in FIG. 10, the operating key 15 and the contact presser member 17 are integrally slightly tilted rearwards with the contact portion of the end of the supporting shaft 15*c* of the operating key 15 and the contact member 20 serving as a fulcrum. At this time, the resilient member 16 externally fitted to the base of the supporting shaft 15*c* of the operating key 15 is partly flexed within the fitting hole 18*c* of the cover 18 as a result of being pressed by the supporting shaft 15*c* as the operating key 15 tilts. Since the corresponding presser protrusions 17*e* of the contact presser member 17 press the contact member 20 towards the right, the movable contact 20*a* that is disposed in correspondence with the position of the direction selection switch D is flexed and deformed into the shape of a flat plate, so that the central portion of the movable contact 20*a* comes into contact with the respective stationary contact 21*a* of the wire 21. This causes a short circuit to occur between the stationary contact 21*a* and the stationary contact 21*b*, so that the contacts are closed, thereby turning on the direction selection switch D.

When the end portion of the cross-shaped keytop 15*b* corresponding to the direction selection switch D is released, the flexed movable contact 20*a* is restored to its original shape. More specifically, the movable contact 20*a* of the contact member 20 separates from the wire stationary contact 21*a* to open the stationary contacts 21*a* and 21*b*, so that the direction selection switch D is turned off. At this time, by addition of the restoring force of the resilient member 16 to the restoring force of the movable contact 20*a*, the operating key 15 returns to its original state. Although the aforementioned description is given in terms of the state of the control switch 14 when the direction selection switch D is operated, the operation of the other parts of the control switch 14 when the other switches A, B, and C are operated is the same as that when the switch D is operated, except that the tilting direction of the operating key 15 and the locations of the stationary contacts 21*a* and 21*b* of the wire 21 that are short-circuited are different.

Figure 11:
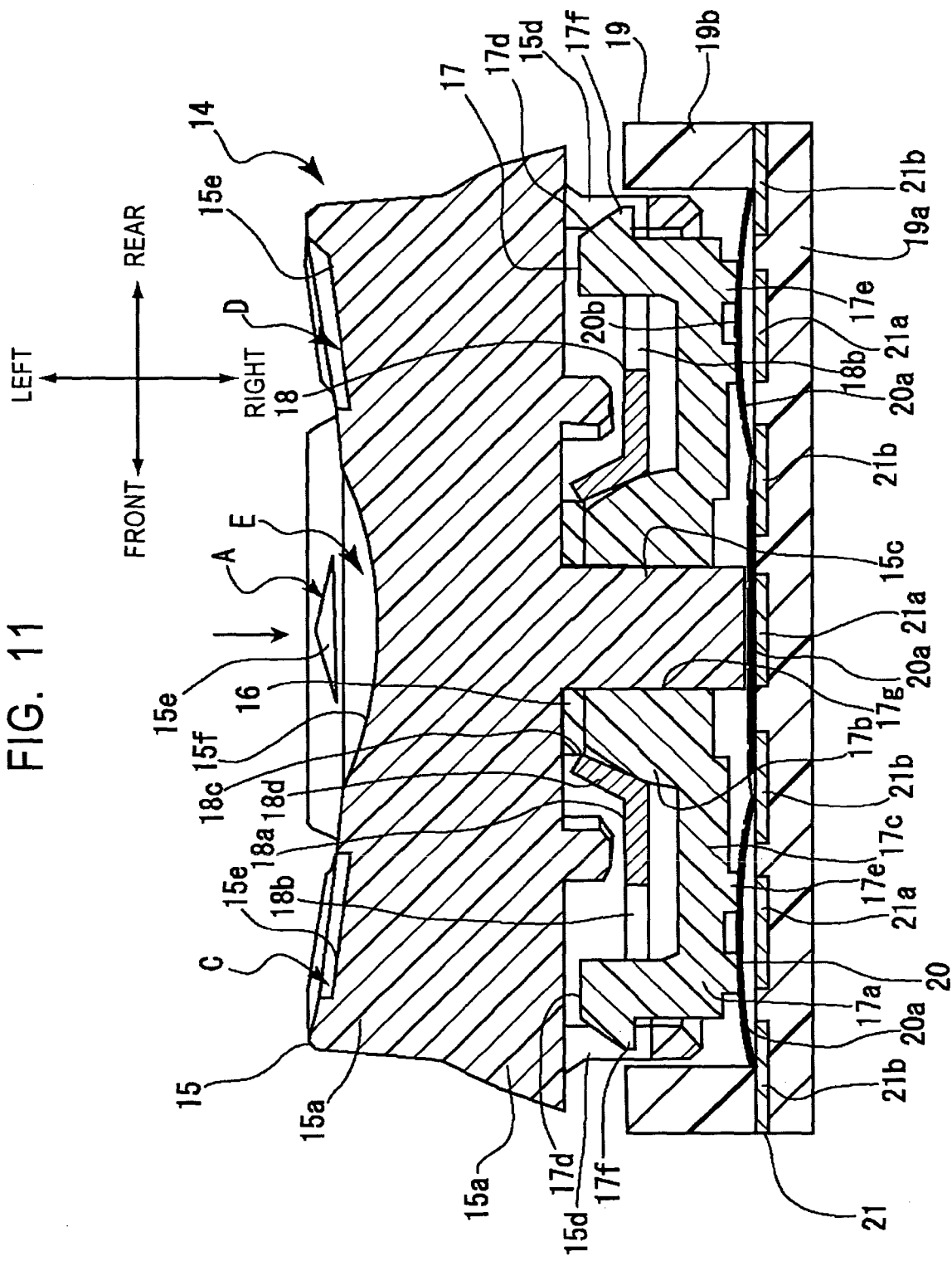
FIG. 11 is a sectional view showing a state in which a determination switch has been pressed.

As shown in FIG. 11, when the central portion of the control switch 14 corresponding to the determination switch E is pressed towards the right, with the position of the contact presser member 17 remaining the same, the supporting shaft 15*c* of the operating key 15 slides rightwards within the insertion hole 17*g* of the boss 17*b*, and, at the same time, the engaging pawls 17*f* of the engaging protrusions 17*d* move relatively leftwards within the engaging holes of the respective engaging protrusions 15*d* of the operating key 15, so that the operating key 15 moves rightwards as a whole. At this time, since the resilient member 16 fitted to the base of the supporting shaft 15*c* of the operating key 15 is interposed between the right surface of the operating key 15 and the boss 17*b* of the contact presser member 17, the resilient member 16 is compressed and deformed as a whole due to a reduction in the space between the right surface of the operating key 15 and the boss 17*b*. The amount by which the supporting shaft 15*c* of the operating key 15 protrudes rightwards from the insertion hole 17*g* of the boss 17*b* of the contact presser member 17 is increased. By this, the end of the supporting shaft 15*c* presses the contact member 20 rightwards, causing the center movable contact 20*a* of the contact member 20 to be flexed and deformed into the shape of a flat plate. The deformation of the center movable contact 20*a* causes the central portion of the movable contact 20*a* to come into contact with the corresponding stationary contact 21*a* of the wire 21, so that a short circuit occurs between the stationary contacts 21*a* and 21*b*, thereby closing the contacts, as a result of which the determination switch E is turned on.

When the central portion of the keytop 15*b* of the switch 14 corresponding to the determination switch E is released, the flexed movable contact 20*a* is restored to its original state, that is, the movable contact 20*a* of the contact member 20 separates from the wire stationary contact 21*a* to open the stationary contacts 21*a* and 21*b*, so that the determination switch E is turned off. At this time, by addition of the restoring force of the resilient member 16 to the restoring force of the movable contact 20*a*, the supporting shaft 15*c* of the operating key 15 slides leftwards within the insertion hole 17*g* of the contact presser member 17, and, at the same time, the engaging pawls 17*f* of the engaging protrusions 17*d* slide relatively rightwards within the engaging holes of the engaging protrusions 15*d* of the operating key 15, so that the operating key 15 as a whole moves leftwards and is restored to its original state.

As described above, when the resilient member 16 is externally fitted to the base of the supporting shaft 15*c* of the operating key 15 in order to assemble the control switch 14, the resilient member 16 is positioned on the left side of the boss 17*b* of the contact presser member 17, and is superimposed upon the boss 17*b*. Therefore, when any one of the portions of the keytop 15*b* is pressed towards the right in order to turn on the corresponding one of the direction selection switches A, B, C, D, and the determination switch E, the resilient member 16 disposed between the operating key 15 and the boss 17b of the contact presser member 17 is deformed and flexed. When the operating key 15 is released, the restoring force of the resilient member 16 for returning to its original shape is added to the restoring force of the flexed movable contact 20a, so that the operating key 15 is quickly restored to its original state.

Next, the various operations that are performed using the control switch 14 will be described in detail.

The video camera 1 can be used by switching between, for example, three modes, a camera mode, a network mode, and a video mode, by a mode change-over switch (not shown). The camera mode is for recording a shot image onto a recording medium. The network mode is for network functions, such as transmitting and receiving mails and browsing a homepage, which are used by connection to the Internet. The video mode is for replaying or editing an image recorded on the recording medium. In the network mode and the video mode, various operations are carried out using the control switch 14 primarily in the reversed accommodated state.

In the basic operations of the control switch 14, any one of the four end portions of the cross-shaped keytop 15b of the operating key 15 corresponding to the direction selection switches A, B, C and D is pressed with, for example, a finger to turn on the corresponding switch; a cursor, a pointer, or an inverted item display on the image display surface 6a of the image display section 3 and the EVF (not shown) is moved to a particular item; and the central portion of the keytop 15b is pressed to turn on the determination switch E and to determine the selection.

For example, when the brightness of the LCD panel 6 is adjusted using the control switch 14, the control switch 14 is operated in the following way.

Figure 15:
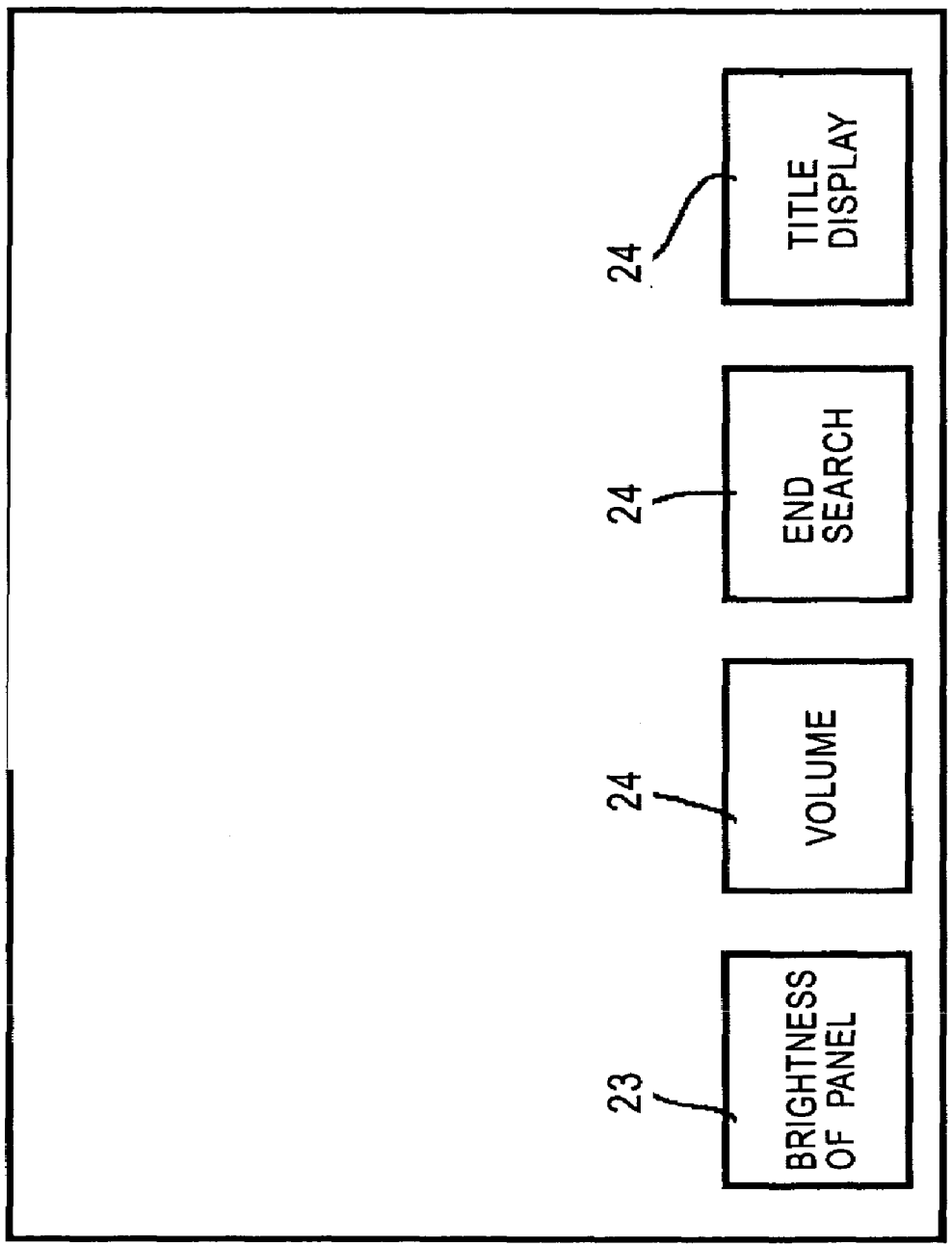
FIG. 15 shows a state of a screen display resulting from selection of a function button shown in FIG. 14.

When, using any of the direction selection switches A, B, C, and D, the cursor, pointer, or inverted item display on the image display surface 6a is moved horizontally and vertically within the image display surface 6a to a function button 22 which is always displayed on the image display surface 6a of the image display section 3 and within the EVF, and, then, when the determination switch E is pressed, a determination is made that the function button 22 is selected, thereby switching the screen display of the image display surface 6a to that shown in FIG. 15.

Figure 16:
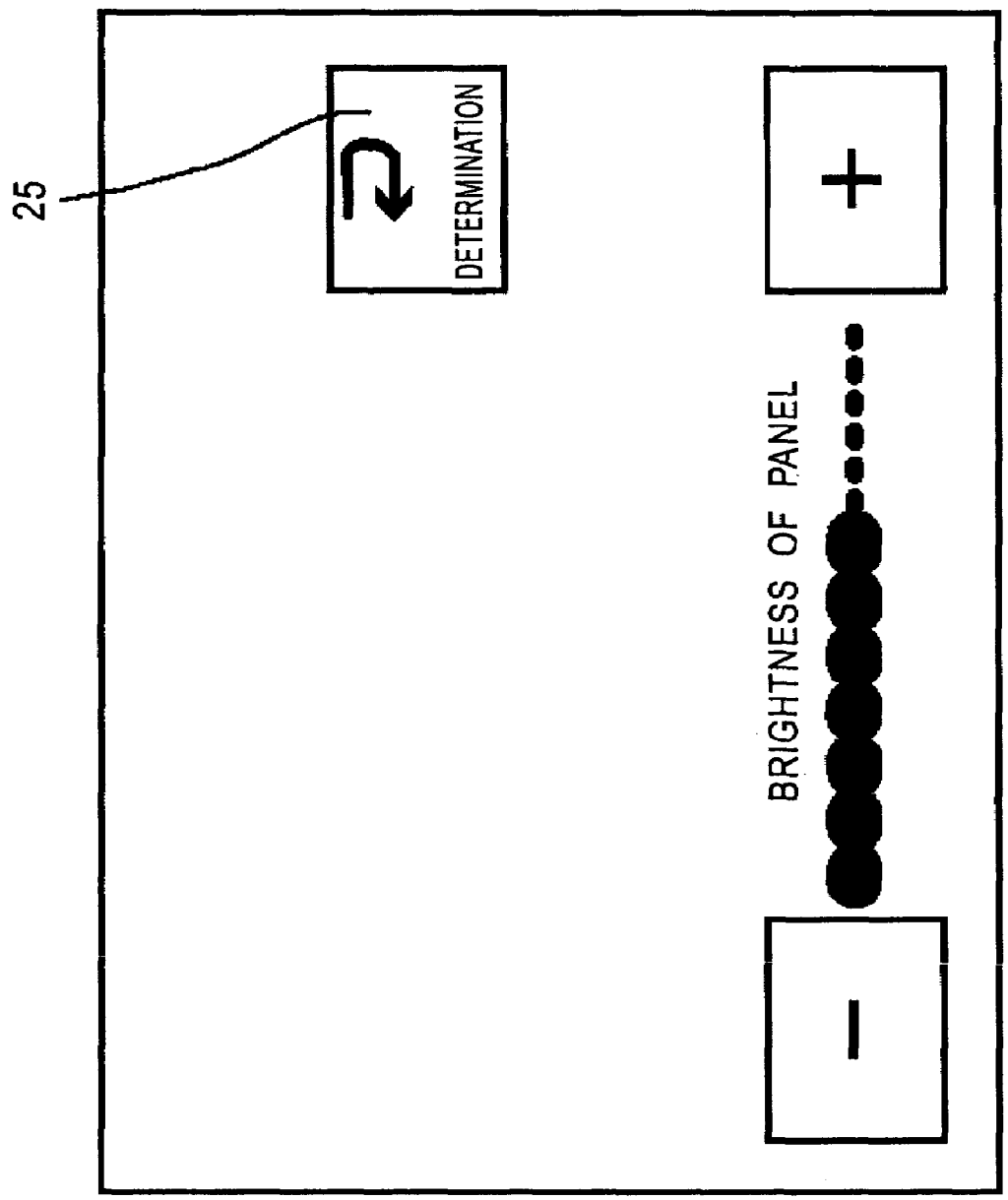
FIG. 16 shows a state of a screen display resulting from the selection of the function button in FIG. 14.

Next, since a plurality of items 24 and an item 23 for adjusting the brightness of the panel are displayed on the image display surface 6a, when the cursor, pointer, or the inverted item display is moved to the item 23 using any of the direction selection switches A, B, C, and D, and, then, when the determination switch E is pressed, the screen display of the image display surface 6a is switched to that shown in FIG. 16.

Then, similarly, using any of the direction selection switches A, B, C, and D, the detailed operations related to adjusting the brightness of the LCD panel 6 of the image display section 3 are properly carried out on the screen shown in FIG. 16 in accordance with the screen display on the image display surface 6a. Then, the cursor, pointer, or inverted item display is moved to the determination button 25 using any one of the direction selection switches A, B, C, and D, and the determination switch E is pressed to adjust the brightness of the panel at an adjusted value.

In the video camera 1, items which are displayed on the image display surface 6a of the image display section 3 and within the EVF and which can be used for performing operations using the control switch 14 include, for example, in the camera mode "menu," "feeder," "self-timer," "memory mix," "camera brightness," "focus," "panel brightness," "volume," "end search," "title," "digital effect," "counter reset," and "date set"; and in the video mode "menu," "volume," "title," "multi-screen search," "replay," "rewind," "replay/pause," "fast forward," "panel brightness," "digital effect," "end search," "data code," "counter reset," and "recording."

As mentioned above, in the video camera 1, the image display section 3 is foldably, unfoldably, and rotatably supported by the hinge mechanism 8, and the image display section 3 is folded and unfolded in a range of 90 degrees with the folding-and-unfolding axis 8a as the center, and is rotated in a range of 270 degrees from the 90-degree unfolded state with the rotational axis 8b as the center in order to be placed in the accommodated state, unfolded state, ordinary shooting state, low-angle shooting state, reversed accommodated state, and forwardly facing shooting state.

In the ordinary shooting state and low-angle shooting state, as shown in FIGS. 2 and 4, the body 2 including the vertically long rectangular housing is used by holding it with the right hand while it is kept vertical, and the control switch 14 is operated while looking at the image display of the image display surface 6a of the image display section 3 or the image display of the EVF. In this case, the control switch 14 is operated with, for example, a finger of the left hand. In the ordinary shooting state and low-angle shooting state, when the body 2 is used by holding it with the right hand while it is kept vertical, the control switch 14 is operated with, for example, a finger of the right hand while looking at the screen display of the image display surface 6a of the image display section 3 or the image display of the EVF.

In the forwardly facing shooting state, the body 2 is used by holding it with the left hand while it is kept vertical, and the control switch 14 is operated using, for example, a finger of the right hand while looking at the screen display of the image display surface 6a of the image display section 3. Even in the forwardly facing shooting state, when the body 2 is used by holding it with the right hand while it is kept vertical, the control switch 14 is operated with, for example, a finger of the left hand while looking at the screen display of the image display surface 6a of the image display section 3.

However, in the reversed accommodated state, as shown in FIG. 3, the vertically long rectangular body 2 of the video camera 1 is primarily used with its long side positioned horizontally as a result of setting it horizontally. In this case, the body 2 is held with the right hand. As shown in FIG. 3, since the control switch 14 is positioned towards the right side on the body 2, it is convenient to operate the control switch 14 with the right thumb.

Figure 5:
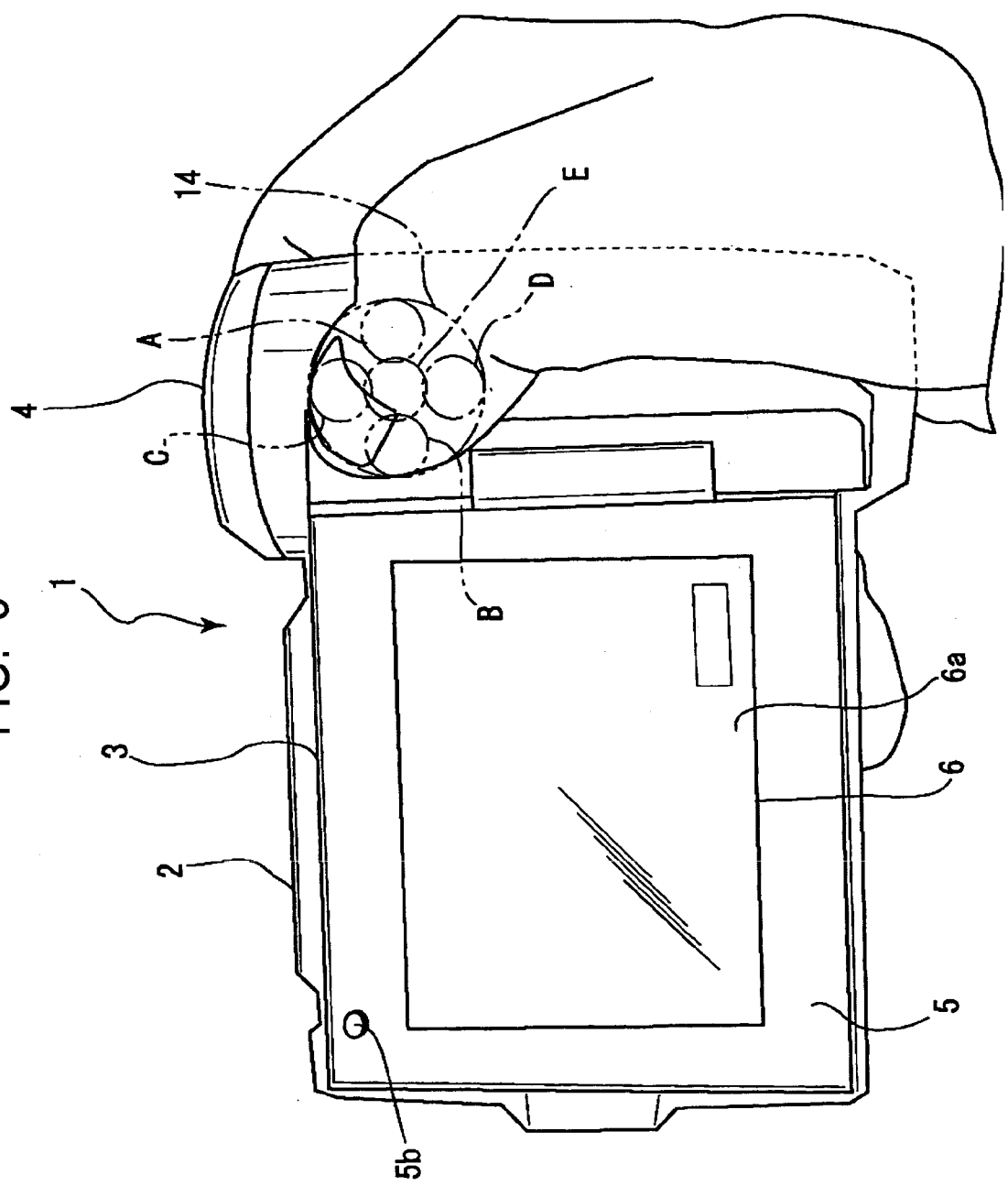
FIG. 5 shows a state of use in a reversed accommodated state in a modification of a body whose shape is partly modified.

When the body 2 is used with its long side positioned horizontally as a result of setting it horizontally, the portion that is held with the right hand of the body 2 corresponds to the portion that accommodates the taking lens 4 of the body 2. Therefore, as shown in FIG. 5, when the video camera 1 is formed so that the top portion of the body 2 is formed with a cylindrical shape in accordance with the shape of a lens barrel of the taking lens 4, the body 2 becomes more easier to hold with the right hand than the body 2 shown in FIG. 3 due to this cylindrical shape. Therefore, the video camera 1 can be more easily held, and the control switch 14 can be easily operated by simply extending the right thumb while keeping one's right hand on the video camera 1.

As described above in the video camera 1, in the reversed accommodated state, the body 2 can be used by holding it with its long side positioned horizontally as a result of setting it horizontally. In this case, in the video camera 1, the body 2 is rotated clockwise by 90 degrees from the vertical state with the left surface of the image display section 3 faced upward.

Therefore, since the body 2 is rotated, in the case where the direction selection switches A, B, C, and D of the control switch 14 which are kept in correspondence with the vertical direction of the display image of the image display surface 6a that is used in the vertical state are used in the reversed accommodated state shown in FIG. 3, when one tries to move the cursor, pointer, or inverted item display vertically on the image display surface 6a, the switches A and B which are positioned on the right and left with respect to the image display surface 6a must be used to move it, whereas, when one tries to move the cursor, pointer, or inverted item display horizontally, the switches C and D which are positioned on the top and bottom with respect to the image display surface 6a must be used to move it.

This makes it very difficult for the user to operate the control switch 14 with ease. This is because, in the reversed accommodated state, the vertical and horizontal directions in the display screen of the image display surface 6a of the image display section 3 do not sensuously match the vertical and horizontal directions to which the direction selection switches A, B, C, and D of the control switch 14, used to move the cursor, pointer, or inverted item display displayed on the image display surface 6a of the image display section 3, correspond.

To overcome this problem in the video camera 1, in the reversed accommodated state, the directions to which the direction selection switches A, B, C, and D of the control switch 14 correspond are changed. More specifically, the directions to which the direction selection switches A, B, C, and D of the control switch 14 correspond are rotated counterclockwise by 90 degrees (hereinafter referred to as "rotating the directions"). The directions of the display image on the image display surface 6a to which the direction selection switches A, B, C, and D of the control switch 14 correspond are, in the state in which the directions are not rotated, such that the switch A corresponds to up, switch B corresponds to down, switch C corresponds to left, and switch D corresponds to right, as mentioned above (initial state).

In the video camera 1, the ON/OFF states of the three detecting means 11, 12, and 13 in the accommodated state, unfolded state, ordinary shooting state, low-angle shooting state, reversed accommodated state, and forwardly facing shooting state are input to a system controller (not shown), and, by combination of the states of the three respective detecting means 11, 12, and 13, a determination is made as to which state the image display section 3 is in (at least, a distinction is made between the reversed accommodated state and the other states), and the ON/OFF setting states of electrical power application to the LCD panel 6 including supplying of an image signal, the ON/OFF setting states of inversion of the display screen of the LCD panel 6, and the ON/OFF setting states of rotation of the directions of the control switch 14 are such as to optimally correspond to each other.

Table 1 shows the relationship between each state resulting from the combination of folding, unfolding, and rotation of the image display section 3 with the ON/OFF states of the folding/unfolding detecting means 11, folding/unfolding angle detecting means 12, and the rotation detecting means 13, the ON/OFF setting states of the application of electrical power to the LCD panel 6, the ON/OFF setting states of the rotation of the directions of the control switch 14, and the ON/OFF setting states of the inversion of the display screen.

TABLE 1

| STATE OF IMAGE DISPLAY SECTION/ FOLDING/ UNFOLDING ANGLE (*) | FOLDING/ UNFOLDING DETECTING MEANS 11 | FOLDING/ UNFOLDING ANGLE DETECTING MEANS 12 | ROTATION DETECTING MEANS 13 | SETTING OF APPLICATION OF POWER TO LCD PANEL | SETTING OF ROTATION OF DIRECTIONS OF CONTROL SWITCH | SETTING OF INVERSION OF DISPLAY |
|---|---|---|---|---|---|---|
| FOLDED (ACCOMMODATED STATE)/0 | ON | OFF | OFF | OFF | OFF | OFF |
| UNFOLDED (UNFOLDED STATE)/0 | OFF | ON | OFF | ON | OFF | OFF |
| UNFOLDED (ORDINARY SHOOTING STATE)/90 | OFF | ON | OFF | ON | OFF | OFF |
| UNFOLDED (LOW-ANGLE SHOOTING STATE)/180 | OFF | ON | OFF | ON | OFF | OFF |
| FOLDED (REVERSED ACCOMMODATED STATE)/180 | OFF | OFF | OFF | ON | ON | OFF |
| UNFOLDED (FORWARDLY FACING SHOOTING STATE)/225-270 | OFF | ON | ON | ON | OFF | ON |

Here, when each state of the image display section 3 is considered in accordance with the actual state of use of the video camera 1, it is necessary to apply electrical power to the LCD panel 6 in the states other the accommodated state; to rotate the directions of the control switch 14 only in the reversed accommodated state; and to invert the display screen only in the forwardly facing shooting state. In the reversed accommodated state, it is necessary to apply electrical power to the LCD panel 6 and to rotate the directions of the control switch, but unnecessary to invert the display screen.

Since the folding/unfolding detecting means 11 is formed so as to be turned on only in the accommodated state, the state of the folding/unfolding detecting means 11 and the application of electrical power to the LCD panel 6 simply correspond in a ratio of 1 to 1, so that, when the folding/unfolding detecting means 11 is turned on, the setting of the application of electrical power to the LCD panel 6 is in an off state. Similarly, since the rotation detecting means 13 is formed so as to be kept on when the angle of rotation of the image display section 3 is within the range of from 225 to 270 degrees, which corresponds to the forwardly facing shooting state, the state of the rotation detecting means 13 and the setting of the inversion of the display screen simply correspond in a ratio of 1 to 1, so that, when the rotation detecting means 13 is turned on, the setting of the inversion of the display screen is in an on state.

However, since the folding/unfolding detecting means 12 is so formed so as to be turned on when the image display section 3 is unfolded to an angle of 90 degrees, it is turned off in the ordinary accommodated state and the reversed accommodated state. Depending on the state of the folding/unfolding angle detecting means 12, the detecting means 12 can only distinguish between the image display section 3 which is in any one of the following four states, the unfolded state, ordinary shooting state, low-angle shooting state, and forwardly facing shooting state, and the image display section 3 in either of the following two states, the ordinary accommodated state and reversed accommodated state, so that the ON/OFF state of the folding/unfolding angle detecting means 12 and the ON/OFF setting state of the rotation of the directions of the control switch 14 can no longer correspond with each other in a simple ratio.

For example, in the case where the ON/OFF state of the folding/unfolding angle detecting means 12 and the ON/OFF setting state of the rotation of the directions of the control switch 14 correspond with each other in a simple ratio, when the image display section 3 is even slightly folded from its 90-degree unfolded state, the folding/unfolding angle detecting switch is switched off, so that the setting of the rotation of the directions of the control switch is brought into an on state. Accordingly, even in the ordinary accommodated state, the setting of the rotation of the directions of the control switch is brought into an on state. However, in the ordinary accommodated state, although the image display section 3 is not used because the setting of the application of electrical power to the LCD panel is off and the image display surface 6a does not face the outside, shooting using the EVF, etc., may be performed. Therefore, when the setting of the rotation of the directions of the control switch is on at this time, the vertical and horizontal directions based on the screen display of the EVF and the vertical and horizontal directions to which the direction selection switches A, B, C, and D, used to, for example, move the cursor, pointer, or inverted item display on the image display surface 6a of the image display section 3, correspond, do not sensuously match.

As shown in Table 1, the reversed accommodated state results from simply folding the image display section 3 with the image display surface 6a facing the outside from the low-angle shooting state. Therefore, when the image display section 3 is folded from the low-angle shooting state in which only the folding/unfolding detecting angle means 12 is turned on, the folding/unfolding angle detecting means 12 is also turned off, so that all three of the detecting means are turned off.

In this way, since a distinction cannot be made between the accommodated state and the reversed accommodated state from only the ON/OFF states of the folding/unfolding angle detecting means 12, in the video camera 1, the rotation of the directions of the control switch 14 is performed only when all of the folding/unfolding detecting means 11, folding/unfolding angle detecting means 12, and rotation detecting means 12 are turned off. When any one of the folding/unfolding detecting means 11, folding/unfolding angle detecting means 12, and rotation detecting means 12 is turned on, the directions of the control switch 14 are not rotated. When the state of the image display section 3 changes from the reversed accommodated state in which the directions of the control switch 14 are rotated to any other state (here, the folding/unfolding angle detecting means 12 is turned on), the directions of the control switch 14 are quickly restored to their initial directions.

In the reversed accommodated state in which the setting of the rotation of the directions of the control switch 14 is on, the directions corresponding to the direction selection switches A, B, C, and D of the control switch 14 are rotated counterclockwise by 90 degrees from the initial directions so that they match the vertical and horizontal directions of the screen display of the image display surface 6a of the image display section 3.

In other words, as shown in FIGS. 3 and 5, the cursor, pointer, or inverted item display can be moved in a particular direction on the image display surface 6a of the image display section 3 by pressing any one of the switches A, B, C, and D that are sensuously positioned in correspondence with the vertical and horizontal directions of the image display surface 6a of the image display section 3 while looking at the image display surface 6a of the image display section 3. At this time, the directions that correspond to the direction selection switches A, B, C, and D are such that the upward direction of the image display surface 6a of the image display section 3 corresponds to the direction selection switch C, the downward direction of the image display surface 6a of the image display section 3 corresponds to the direction selection switch D, the leftward direction of the image display surface 6a of the image display section 3 corresponds to the direction selection switch B, and the rightward direction of the image display surface 6a of the image display section 3 corresponds to the direction selection switch A. Therefore, it is possible to considerably enhance the operability in the above-described video camera 1 when, for example, using a network function in the network mode or replaying or editing an image recorded on a recording medium in the video mode when the image display section 3 is in the reversed accommodated state.

Accordingly, in the video camera 1, when the video display section 3 is in the reversed accommodated state in which the body 2 is used with its long side positioned horizontally as a result of setting it horizontally, the control switch 14 is disposed at a location where it can be easily operated with the thumb of the right hand holding the body 2, and the directions of the control switch 14 correspond to the vertical and horizontal directions of the screen display of the image display surface 6a of the image display section 3 in the reversed accommodated state and the vertically used body 2 is automatically rotated by 90 degrees. Therefore, when the body 2 is used vertically and when it is used horizontally, it can be used in an optimal state in correspondence with the vertical and horizontal directions of the image display surface 6a of the image display section 3. Moreover, it is no longer necessary to provide separate special-purpose switches when the vertically long rectangular video camera 1 is used vertically and when it is used horizontally, respectively, thereby resulting in advantageous costs.

In the video camera 1, the body 2 has a housing having a vertically long rectangular shape during ordinary use, and the image display section 3 is folded and unfolded with the folding-and-unfolding axis 8a extending horizontally parallel to the optical axis of the taking lens as the center of rotation and is accommodated in the form of a vertically long rectangle along the side surface of the body. Therefore, without sacrificing the visibility of the image display section 3, the video camera 1 can be reduced in size as a whole, and, if the body 2 is of the same size, the image display section 3 can have a larger display surface 6a than an image display section which is unfolded horizontally.

The structure of the control switch used in the video camera 1 is not limited to that of the above-described control switch 14. Instead of using the control switch 14, it is possible to use, for example, a control switch in which four switches having small circular operating keys are disposed at end portions of a cross-shaped portion, one switch similar to these switches is separately disposed in the center of these four switches, and these five switches are used as the direction selection switches A, B, C, and D and the determination switch E.

Although, in the above-described embodiment, the image recording/replaying device of the present invention is described taking as an example the video camera 1 including an image display section which is folded and unfolded with respect to the body with the folding/unfolding axis disposed horizontally and parallel to the optical axis of the taking lens as the center, the present may be applied to a more generally used image recording/replaying device including an image display section which is folded and unfolded with respect to the body with a folding-and-unfolding axis disposed perpendicular to the optical axis of the taking lens as a center.

The specific forms and structures of each portion illustrated in the embodiment are only examples in carrying out the present invention, so that they are not to be construed as limiting the technical scope of the present invention.

As is clear from the foregoing description, the image recording/replaying device of the present invention includes an image display section foldably, unfoldably, and rotatably supported at a body including a taking lens. The image recording/replaying device comprises a control switch comprising an operating key and a plurality of contacts disposed at end portions and an intersection of a cross-shaped portion of the operating key in correspondence with end portions and the central portion of the operating key, in which, by pressing any one of the end portions and the central portion of the operating key, the contact disposed in correspondence with the pressed portion is closed. The control switch further comprises direction selection switches which are such that particular directions within a display screen of the image display section correspond to the directions of the positions of the four end portions of the operating key. The direction selection switches are such that the directions used within the display screen of the image display section and corresponding to the directions of the positions of the four end portions of the operating key are changed in accordance with a change in the orientation of the image display section resulting from rotation of the image display section.

Therefore, according to the present invention, in the various modes of use of the image recording/replaying device, the control switch can be used with ease in accordance with the orientation of the image display section.

In the present invention, the body has a housing having a vertically long rectangular form at the time of ordinary use of the body, and the image display section is folded and unfolded with a folding-and-unfolding axis extending horizontally and parallel to an optical axis of the taking lens as the center of rotation, and is accommodated in the vertically long rectangular form along a side surface of the body. Therefore, without sacrificing the visibility of the image display section, the video camera can be reduced in size as a whole, and, if the body is of the same size, the image display section can have a larger image display surface than an image display section which is unfolded horizontally.

In the present invention, when the body is used by holding the body with a long side set horizontally while an image display surface of the image display section is accommodated facing the outside, the control switch is disposed at a location where the control switch is easily operated with a hand holding the body. Therefore, it is possible to considerably enhance the operability of the control switch when, for example, editing or replaying an image recorded on a recording medium.

The invention claimed is:

1. A hand-held image recording/replaying device including an image display section having an image display surface, said image display section being foldably, unfoldably and rotatably supported at a body having relatively parallel long sides and parallel short sides, the long sides being perpendicular to and extending between the short sides, said body housing a taking lens disposed in the vicinity of one of said short sides and said one short side being cylindrically shaped in accordance with a lens barrel shape, the taking lens having an optical axis, the image recording/replaying device comprising:

a hand-operated control switch mounted at a predetermined location on said body proximate a corner established by said one short side and an adjacent long side of said body and comprising first and second pairs of contact elements and an operating key, said first pair of contact elements being manually operable in a pressing direction to cause horizontal movement or horizontal selection of a display element within a display screen of said image display section and said second pair of contact elements being manually operable in said pressing direction to cause vertical movement or vertical selection of a display element within said display screen, said pressing direction being substantially perpendicular to the optical axis of said taking lens;

a rotation detecting section operable to detect that the image display section has been rotated by an angle of approximately 90° when said image recording/replaying device is re-oriented, said rotation detecting section including plural detectors, at least one of which detects when said image display section is rotated by more than a predetermined angle and at least another of which detects the folded and unfolded state of said image display section;

wherein when one of said detectors detects that said image display section is rotated by approximately 90°, said first pair of contact elements cause said vertical movement or vertical selection of a display element and said second pair of contact elements cause said horizontal movement or horizontal selection of a display element;

said cylindrically shaped short side of the body housing the taking lens being mounted as a hand-holding grip of said image recording/replaying device; and when a user holds the body by gripping the cylindrically shaped short side of the body in the user's hand such that said relatively long sides are disposed in a horizontal orientation while, at the same time, said other detector detects that said image display section is folded on said body such that said image display surface faces the outside to be viewed by the user, the control switch is exposed to the outside without interference from said image display section and is easily operated by the thumb of the very same hand of the user that holds the grip.

2. An image recording/replaying device according to claim 1, wherein the body has a vertically long rectangular form at the time of ordinary use of the body, and wherein the image display section is folded and unfolded with a folding-and-unfolding axis extending horizontally and parallel to the optical axis of the taking lens as the center of rotation, and is accommodated in the vertically long rectangular form along a side surface of the body.

\* \* \* \* \*